US010303870B2

(12) United States Patent
Tanaka

(10) Patent No.: US 10,303,870 B2
(45) Date of Patent: May 28, 2019

(54) INFORMATION PROCESSING APPARATUS, INFORMATION PROCESSING METHOD, AND COMPUTER PROGRAM PRODUCT

(71) Applicant: Hiroyuki Tanaka, Fukuoka (JP)

(72) Inventor: Hiroyuki Tanaka, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 237 days.

(21) Appl. No.: 14/961,051

(22) Filed: Dec. 7, 2015

(65) Prior Publication Data

US 2016/0171204 A1 Jun. 16, 2016

(30) Foreign Application Priority Data

Dec. 15, 2014 (JP) ................................. 2014-253397

(51) Int. Cl.
| | |
|---|---|
| *G06F 21/36* | (2013.01) |
| *G06F 3/0484* | (2013.01) |
| *G03G 15/00* | (2006.01) |
| *G06F 21/31* | (2013.01) |

(52) U.S. Cl.
CPC .......... *G06F 21/36* (2013.01); *G03G 15/502* (2013.01); *G03G 15/5091* (2013.01); *G06F 3/0484* (2013.01); *G06F 21/31* (2013.01)

(58) Field of Classification Search
CPC ...... H04L 63/083; H04L 9/3226; G06F 21/30
USPC ................... 726/15–17; 358/474, 1.15–1.14; 705/2–4; 713/182–184
See application file for complete search history.

(56) References Cited

U.S. PATENT DOCUMENTS

| | | | | |
|---|---|---|---|---|
| 5,579,088 A | * | 11/1996 | Ko ......................... | G03G 21/04 399/12 |
| 6,345,294 B1 | * | 2/2002 | O'Toole ............. | G06K 13/0825 709/222 |
| 7,610,618 B2 | * | 10/2009 | Patrick .................... | H04L 63/08 726/7 |

(Continued)

FOREIGN PATENT DOCUMENTS

| | | |
|---|---|---|
| JP | 8-44261 A | 2/1996 |
| JP | H09-200401 | 7/1997 |

(Continued)

OTHER PUBLICATIONS

U.S. Appl. No. 14/729,263, filed Jun. 3, 2015.
Office Action dated Jul. 3, 2018 in Japanese Patent Application No. 2014-253397, 3 pages.

*Primary Examiner* — Lynn D Feild
*Assistant Examiner* — Viral S Lakhia
(74) *Attorney, Agent, or Firm* — Oblon, McClelland, Maier & Neustadt, L.L.P.

(57) ABSTRACT

An information processing apparatus includes a reception unit which receives first input information which is arbitrary set in conjunction with a login of the first user, a restriction unit which starts imposing a restriction of use of the information processing apparatus at a predetermined timing in a case that a second user logs in to the information processing apparatus while a login state of the first user is continued and a release unit which releases the restriction in response to inputting of second input information, which matches the first input information received by the reception unit, while the use of the information processing apparatus is restricted.

20 Claims, 21 Drawing Sheets

(56) References Cited

U.S. PATENT DOCUMENTS

| | | | |
|---|---|---|---|
| 7,904,915 B2 | 3/2011 | Tanaka | |
| 8,218,165 B2 | 7/2012 | Matsushima | |
| 8,316,237 B1* | 11/2012 | Felsher | H04L 9/0825 380/282 |
| 8,417,176 B2 | 4/2013 | Shoji et al. | |
| 8,516,475 B2 | 8/2013 | Akiyoshi et al. | |
| 8,566,905 B2 | 10/2013 | Tanaka | |
| 8,646,060 B1* | 2/2014 | Ben Ayed | H04L 63/0853 726/9 |
| 8,749,814 B2 | 6/2014 | Tanaka | |
| 8,775,821 B2* | 7/2014 | Lund | G06F 21/34 713/184 |
| 8,966,507 B2 | 2/2015 | Tanaka | |
| 9,047,031 B2 | 6/2015 | Tanaka | |
| 9,060,083 B2 | 6/2015 | Tanaka | |
| 9,167,113 B2 | 10/2015 | Akiyoshi et al. | |
| 9,286,482 B1* | 3/2016 | Dumont | G06F 21/62 |
| 9,984,225 B2* | 5/2018 | Huang | G06F 21/36 |
| 2007/0156605 A1* | 7/2007 | Bleumer | G06F 21/10 705/64 |
| 2008/0055625 A1* | 3/2008 | Akiyoshi | G06F 8/60 358/1.13 |
| 2010/0036796 A1* | 2/2010 | Kajikawa | H04N 1/00389 706/54 |
| 2010/0212001 A1* | 8/2010 | Kashyap | G06F 21/31 726/7 |
| 2010/0313248 A1* | 12/2010 | Krivosheev | G06F 21/6263 726/5 |
| 2011/0197266 A1* | 8/2011 | Chu | H04L 9/3228 726/5 |
| 2011/0265149 A1* | 10/2011 | Ganesan | H04L 9/3226 726/4 |
| 2012/0323717 A1* | 12/2012 | Kirsch | G06Q 20/0855 705/26.1 |
| 2013/0063774 A1* | 3/2013 | Nuggehalli | G06F 3/1207 358/1.15 |
| 2014/0041002 A1* | 2/2014 | Liu | H04L 63/083 726/7 |
| 2014/0211233 A1* | 7/2014 | Biswal | G06F 3/1238 358/1.14 |
| 2014/0279647 A1* | 9/2014 | Tolcher | G06Q 30/06 705/330 |
| 2014/0325646 A1* | 10/2014 | Turgeman | G06F 21/316 726/22 |
| 2014/0373136 A1* | 12/2014 | Igelka | H04L 63/1441 726/22 |
| 2014/0380462 A1* | 12/2014 | Hosoda | G06F 21/608 726/17 |
| 2015/0079967 A1* | 3/2015 | Mullins | H04W 48/04 455/419 |
| 2015/0092252 A1* | 4/2015 | Kwak | H04N 1/00925 358/474 |
| 2015/0244883 A1 | 8/2015 | Tanaka | |
| 2015/0269508 A1* | 9/2015 | Damboritz | G06Q 10/06311 705/2 |
| 2016/0070511 A1* | 3/2016 | Nishida | H04N 1/0023 358/1.14 |
| 2016/0261582 A1* | 9/2016 | Lee | H04W 12/06 |

FOREIGN PATENT DOCUMENTS

| | | |
|---|---|---|
| JP | 2004-171044 | 6/2004 |
| JP | 2005-258672 A | 9/2005 |
| JP | 2008-271499 | 11/2008 |
| JP | 2014-059721 | 4/2014 |

* cited by examiner

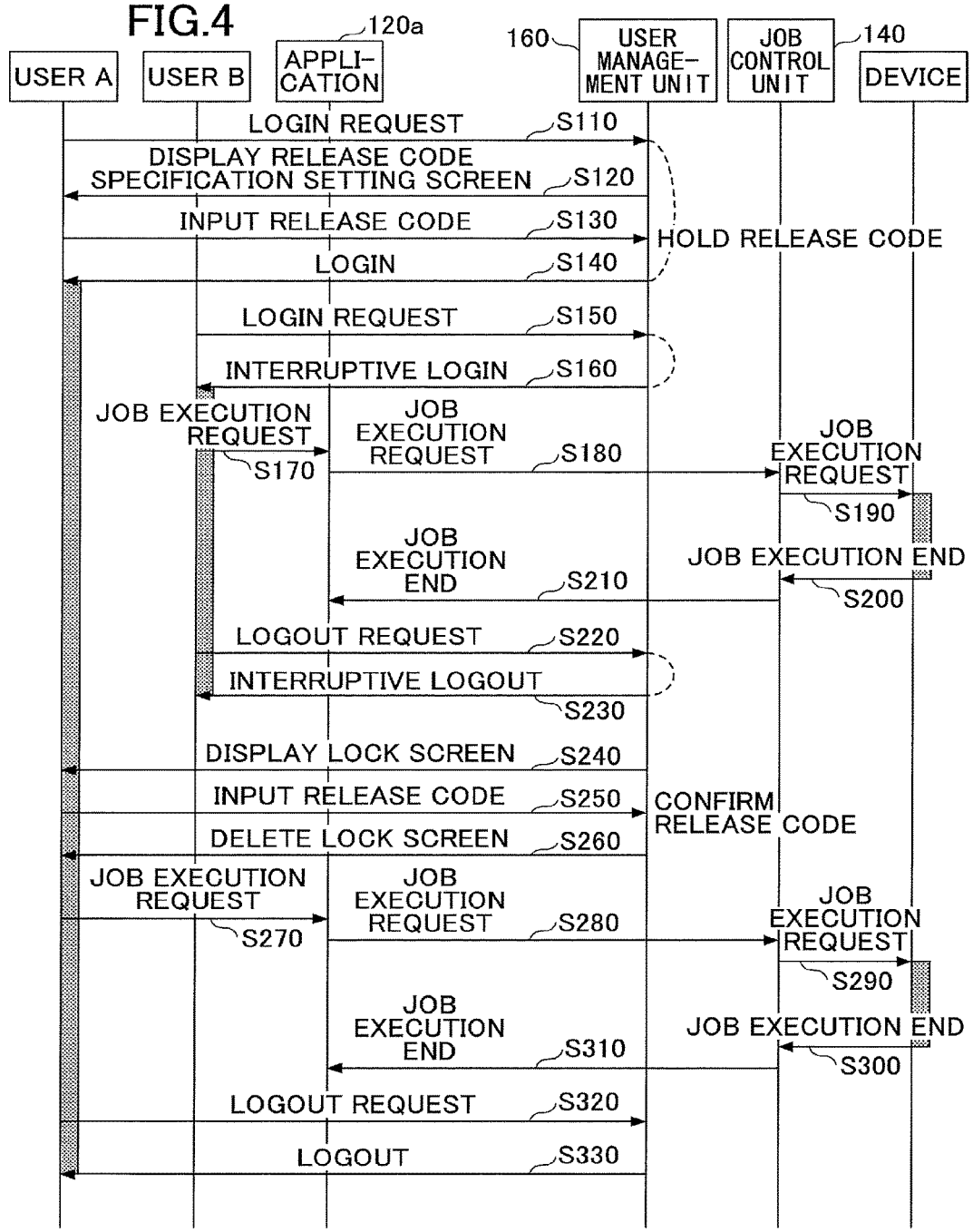

LOGIN
    INPUT A USER NAME AND A PASSWORD

USER NAME [          ]    [ INPUT ]

PASSWORD  [          ]    [ INPUT ]

LOGIN
    INSERT AN IC CARD

LOGGED IN
   SET A FOUR DIGIT RELEASE CODE

| 7 | 8 | 9 |
|---|---|---|
| 4 | 5 | 6 |
| 1 | 2 | 3 |
| 0 |||

LOGGED IN
   SET AN EIGHT DIGIT RELEASE CODE

| 7 | 8 | 9 |
|---|---|---|
| 4 | 5 | 6 |
| 1 | 2 | 3 |
| 0 |||

OK

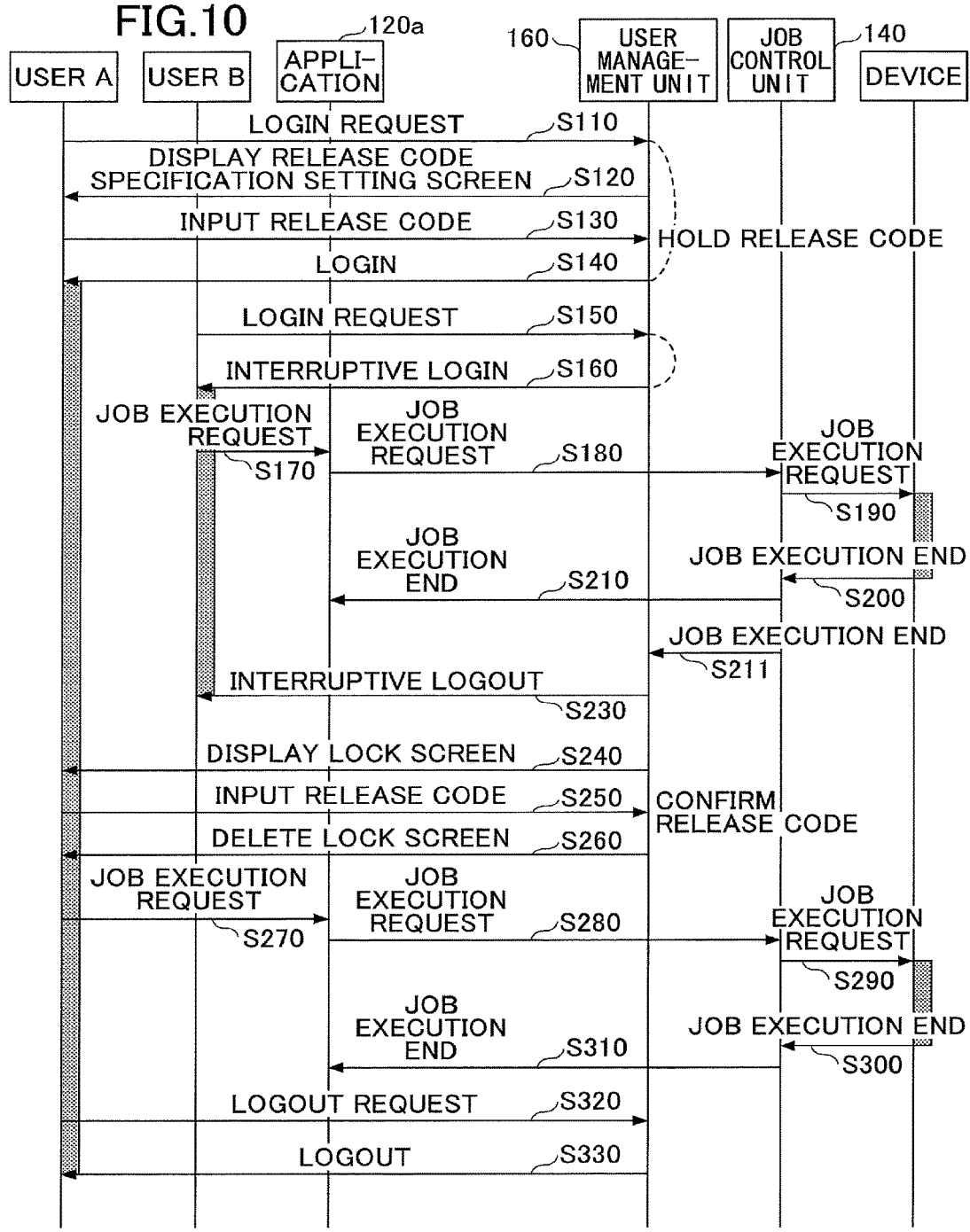

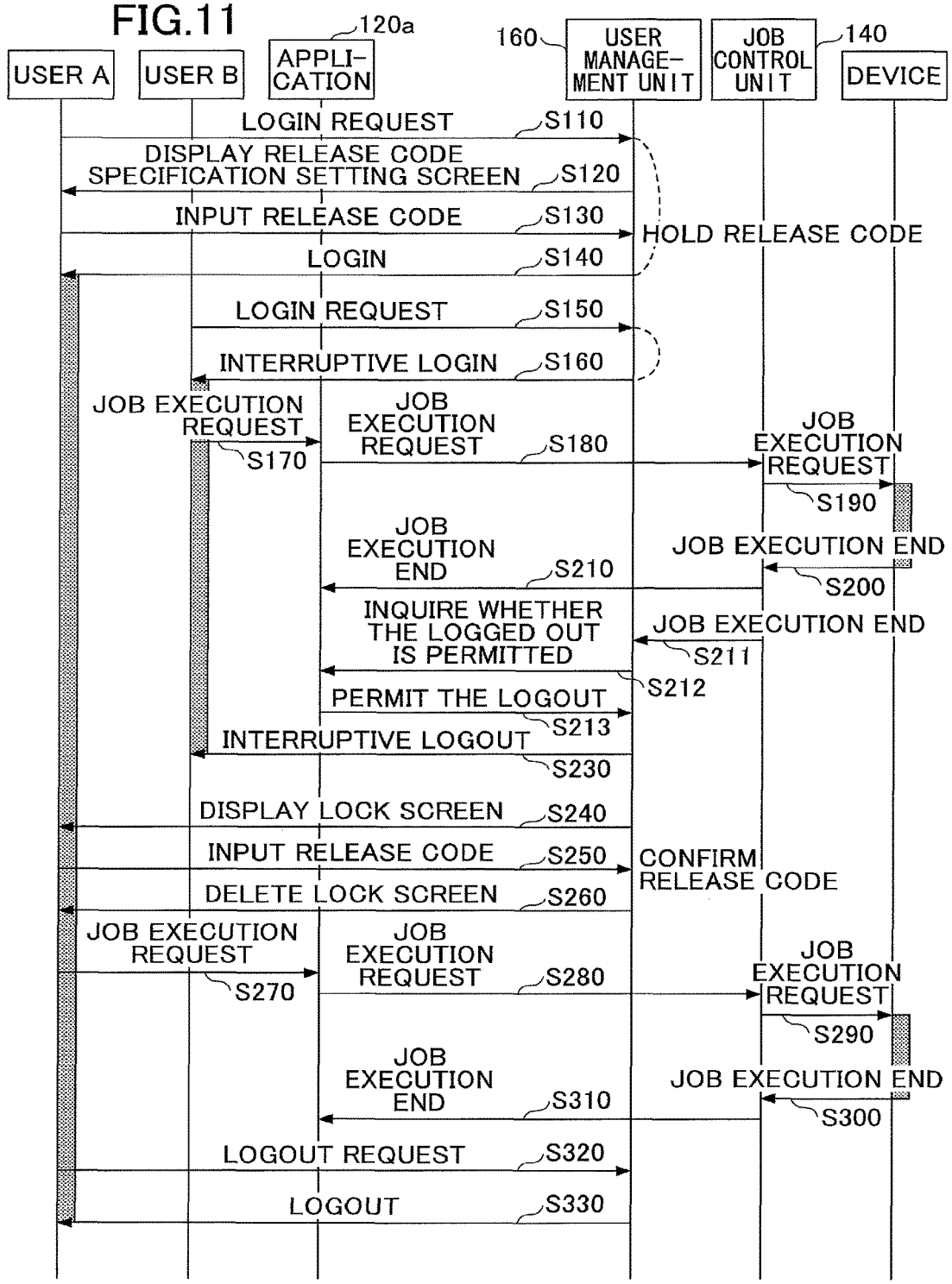

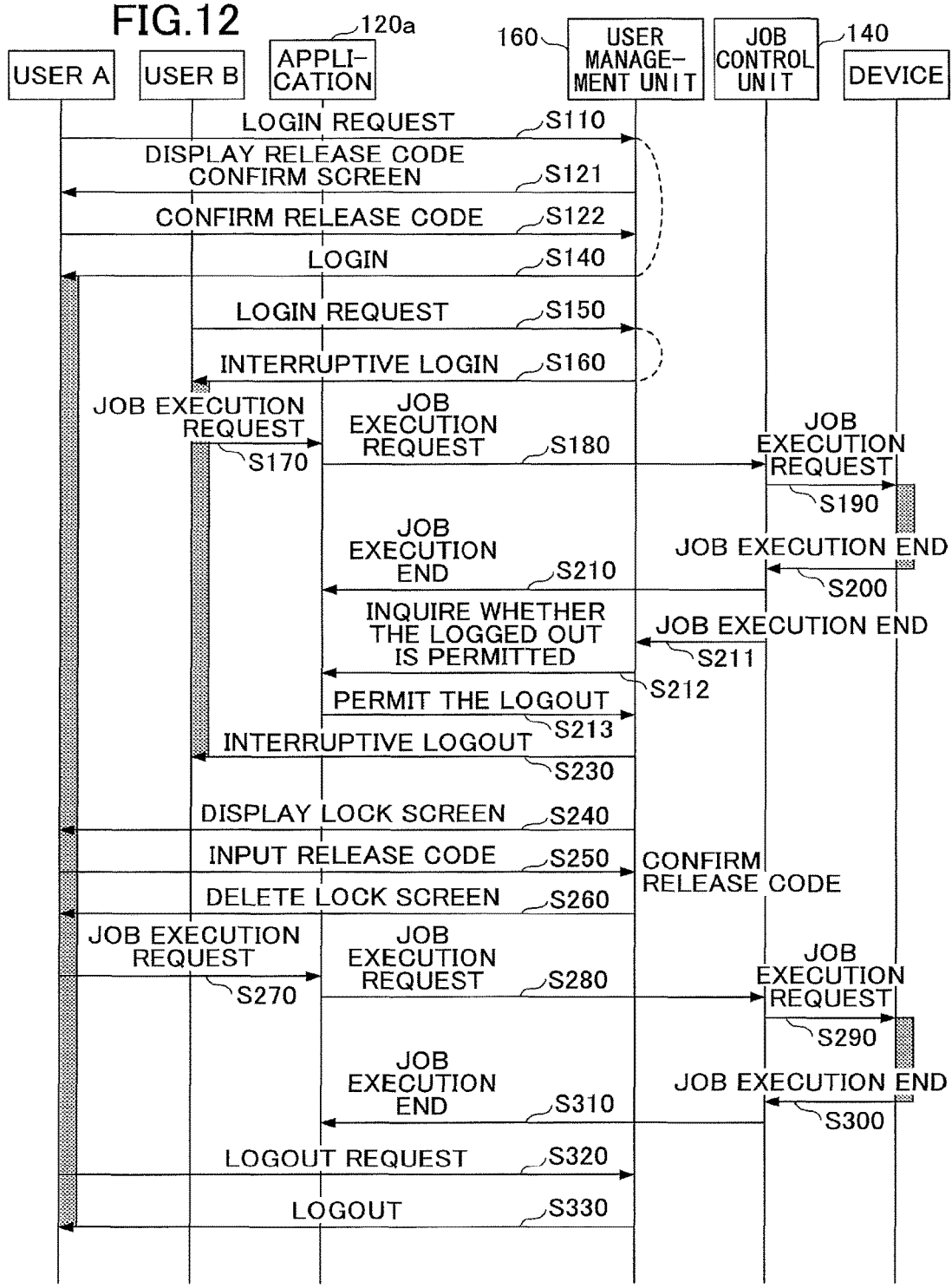

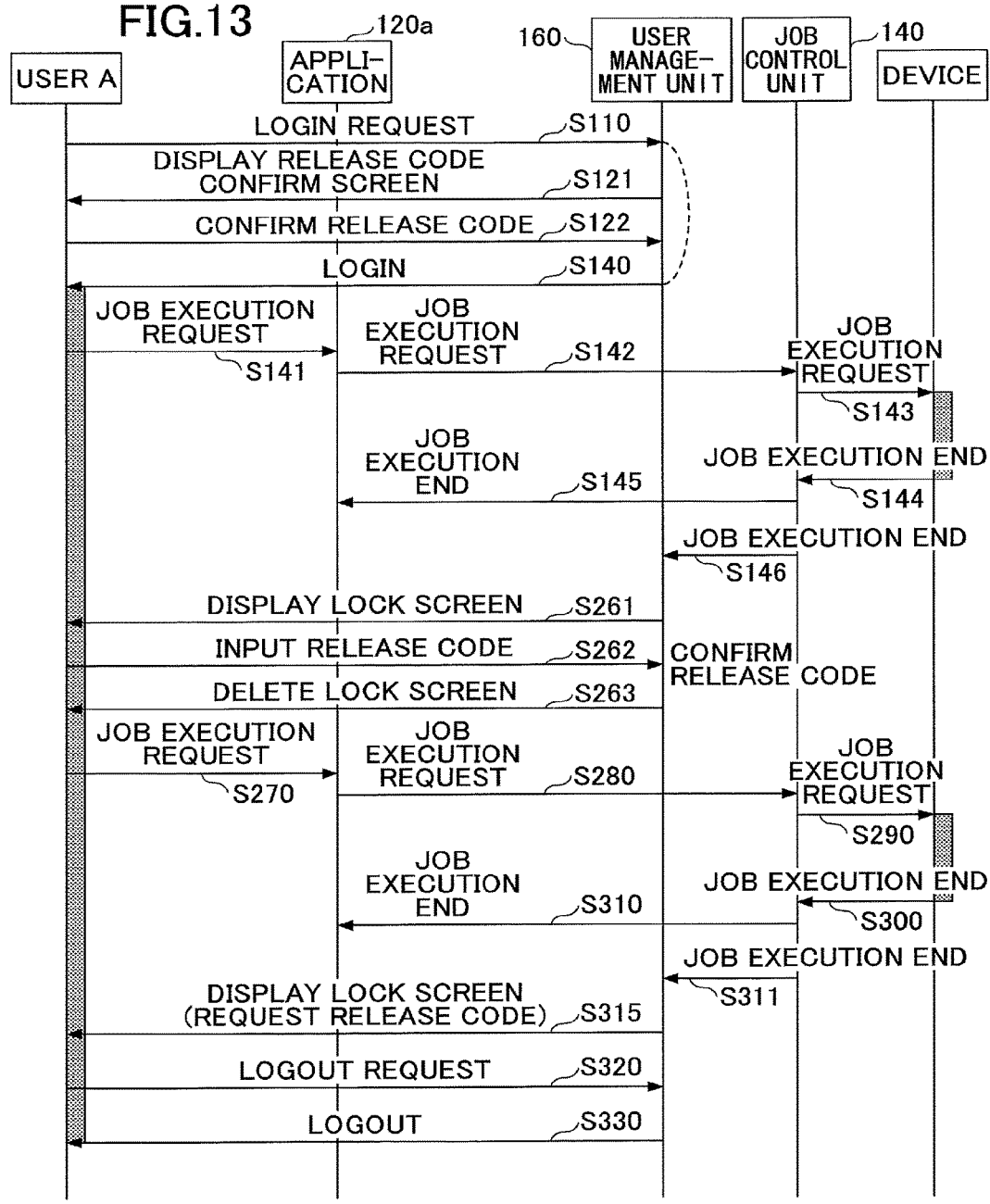

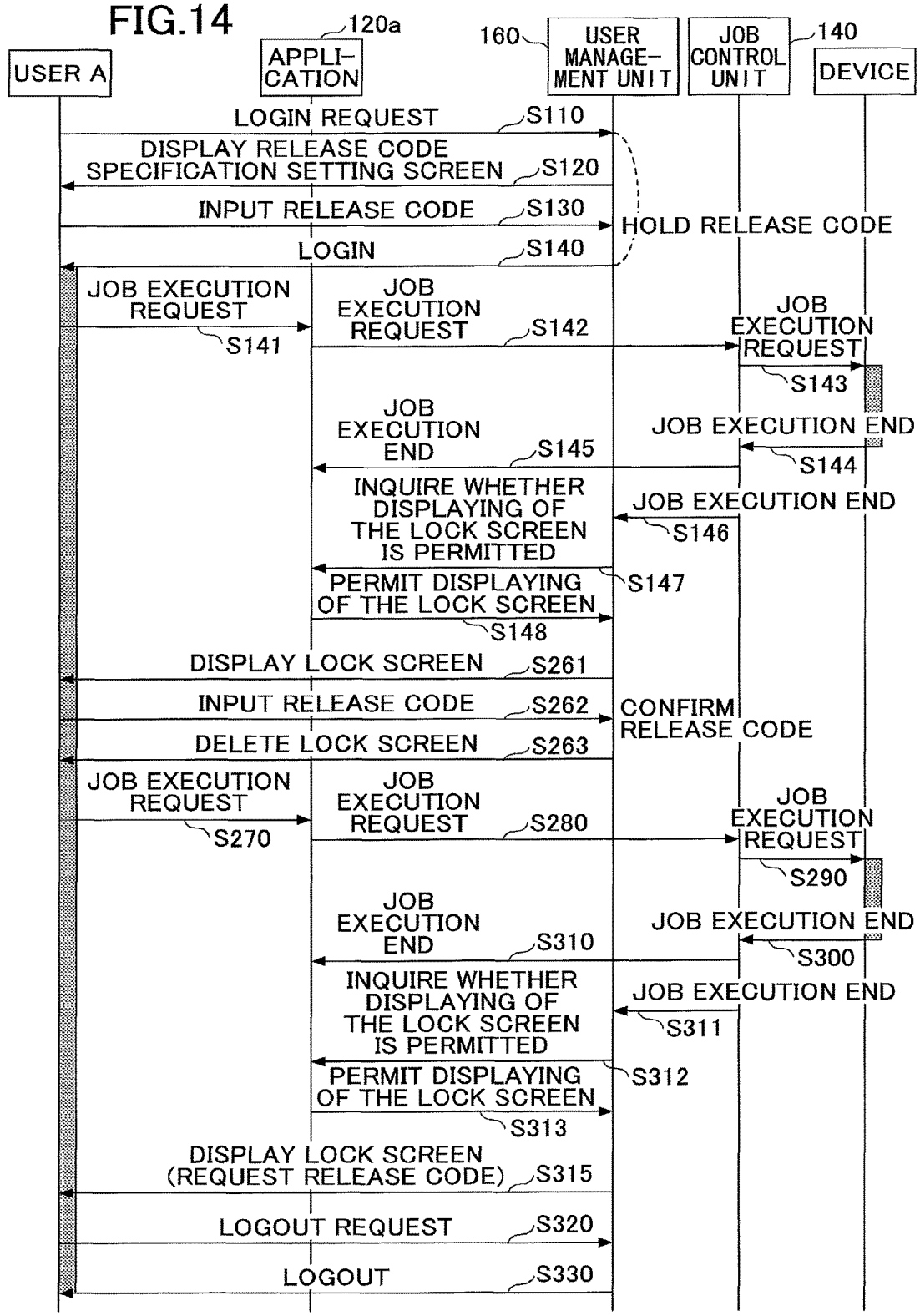

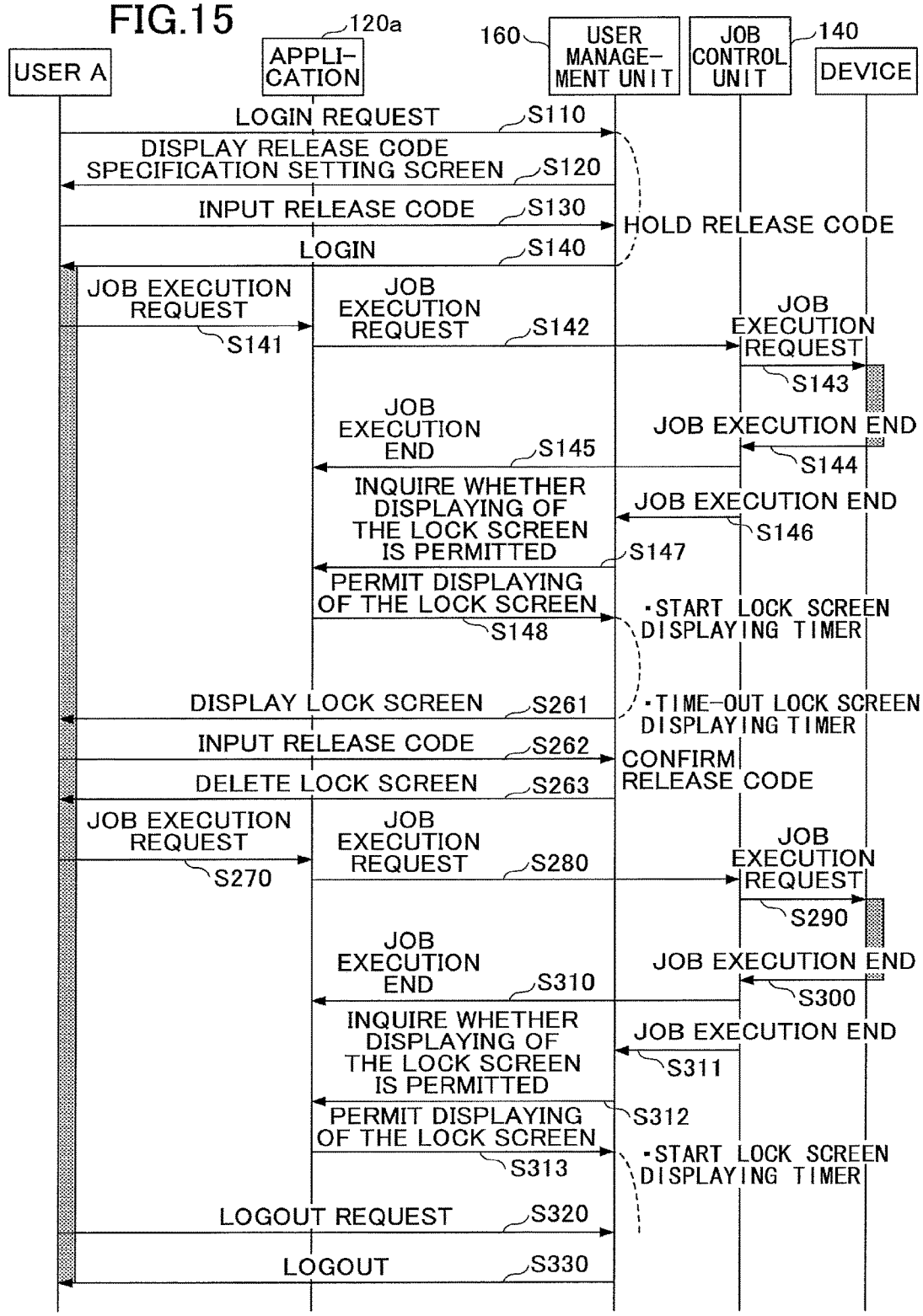

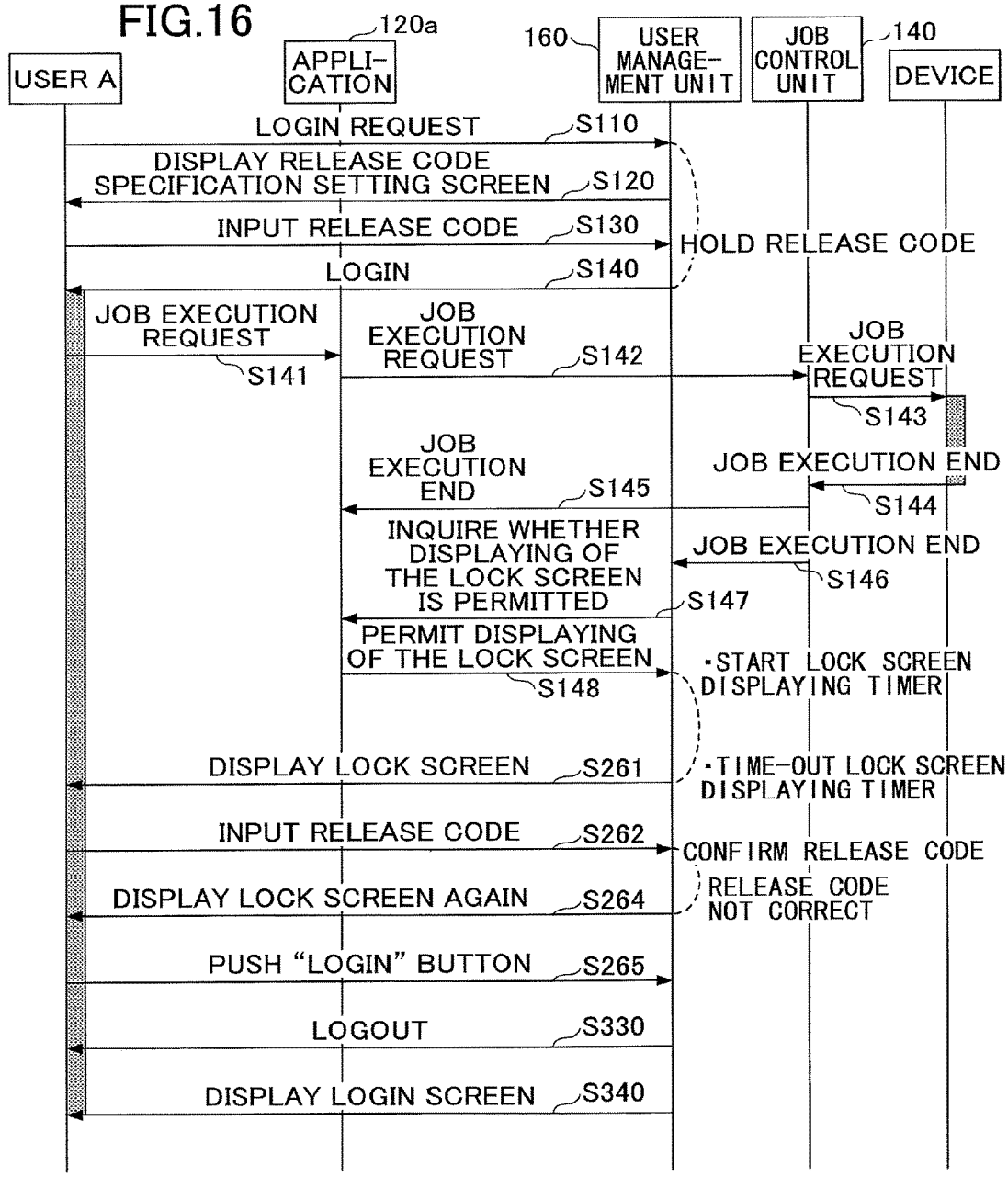

FIG.17A

INPUT RELEASE CODE IS NOT CORRECT
INPUT THE RELEASE CODE

| 1 | 2 | 3 | 4 |

| 7 | 8 | 9 |
| 4 | 5 | 6 |
| 1 | 2 | 3 |
| 0 |

OK

IF THE RELEASE CODE IS FORGOTTEN,
EXECUTE A LOGOUT ONCE

LOGOUT

FIG.17B

INPUT RELEASE CODE IS NOT CORRECT
INPUT THE RELEASE CODE

| 7 | 8 | 9 |
| 4 | 5 | 6 |
| 1 | 2 | 3 |
| 0 |

OK

IF THE RELEASE CODE IS FORGOTTEN,
REEXECUTE A LOGIN

LOGIN

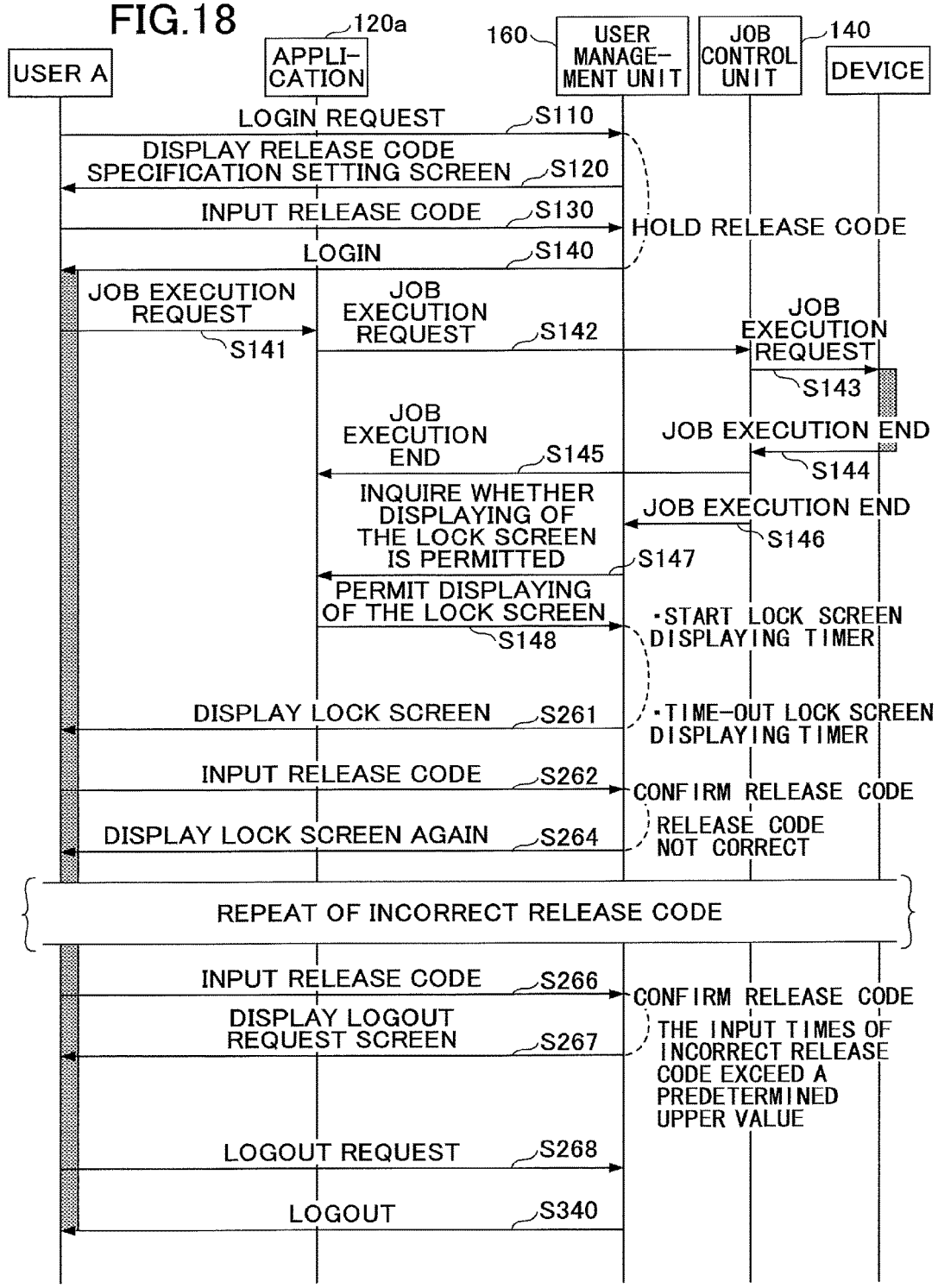

LOCK SCREEN RELEASE CODE
SET THE TYPE OF THE RELEASE CODE

☐ A FOUR DIGIT NUMBER (0-9)

☐ AN EIGHT DIGIT NUMBER (0-9)

☐ A SIXTEEN DIGIT ALPHANUMERIC
(a-z, A-Z, 0-9)

☐ A SYSTEM NOTIFICATION

[ OK ]  [ CANCEL ]

LOCK SCREEN DISPLAYING TIMER
SET THE LOCK SCREEN DISPLAYING
TIME-OUT TIME

[          ]  [ CLEAR ]   | 7 | 8 | 9 |
0-60 MINUTES              | 4 | 5 | 6 |
                          | 1 | 2 | 3 |
                          |   | 0 |   |

[ OK ]  [ CANCEL ]

INFORMATION PROCESSING APPARATUS, INFORMATION PROCESSING METHOD, AND COMPUTER PROGRAM PRODUCT

BACKGROUND OF THE INVENTION

1. Field of the Invention

The disclosures herein generally relate to an information processing apparatus, an information processing method, and a computer program product for being executed on a computer.

2. Description of the Related Art

An image forming apparatus, such as a copy machine, a multifunction peripheral or the like, which is installed in an office is known in the art. The image forming apparatus may be shared by a plurality of users.

Such the image forming apparatus which allows another user to login to the image forming apparatus while a login state of a login user is continued has a problem such as an improper use by the other user and management of amount of usage. To request the login operation again after the login user logs out may prevent the problem such as the improper use. However, this needs to perform an operation for returning the login user every time, and may be troublesome sometimes.

SUMMARY OF THE INVENTION

It is a general object of at least one embodiment of the present invention to provide an information processing apparatus, an information processing method, and a computer program product for being executed on a computer that substantially obviates one or more problems caused by the limitations and disadvantages of the related art.

In one embodiment, an information processing apparatus includes a reception unit configured to receive first input information which is arbitrarily set in conjunction with a login of the first user, a restriction unit configured to start imposing a restriction of use of the information processing apparatus at a predetermined timing in a case that a second user logs in to the information processing apparatus while a login state of the first user is continued, and a release unit configured to release the restriction in response to inputting of second input information, which matches the first input information received by the reception unit, while the use of the information processing apparatus is restricted.

BRIEF DESCRIPTION OF THE DRAWINGS

FIG. 4 is a sequence chart for illustrating an example of processing procedures executed by the image forming apparatus according to the first embodiment;

FIGS. 5A, 5B, and 5C are diagrams illustrating examples of login screens;

FIGS. 7A and 7B are diagrams illustrating examples of release code set screens;

FIG. 10 is a sequence chart for illustrating an example of processing procedures executed by the image forming apparatus according to a second embodiment;

FIG. 11 is a sequence chart for illustrating an example of processing procedures executed by the image forming apparatus according to a third embodiment;

FIG. 12 is a sequence chart for illustrating an example of processing procedures executed by the image forming apparatus according to a fourth embodiment;

FIG. 13 is a sequence chart for illustrating an example of processing procedures executed by the image forming apparatus according to a fifth embodiment;

FIG. 14 is a sequence chart for illustrating an example of processing procedures executed by the image forming apparatus according to a sixth embodiment;

FIG. 15 is a sequence chart for illustrating an example of processing procedures executed by the image forming apparatus according to a seventh embodiment;

FIG. 16 is a sequence chart for illustrating an example of processing procedures executed by the image forming apparatus according to an eighth embodiment;

FIGS. 17A and 17B are screen examples which are displayed in response to the input of an incorrect release code;

FIG. 18 is a sequence chart for illustrating an example of processing procedures executed by the image forming apparatus according to a ninth embodiment;

FIGS. 21A, 21B, and 21C are screen examples of a screen of various setting.

DESCRIPTION OF THE PREFERRED EMBODIMENTS

In the following, embodiments of the present invention will be described with reference to the accompanying drawings.

Figure 1:
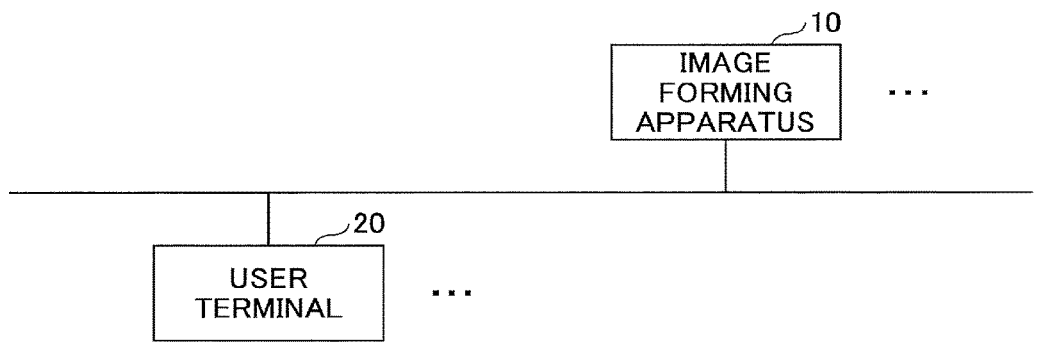
FIG. 1 is a schematic diagram illustrating a system configuration according to a first embodiment.

Embodiments of the present invention are described with reference to the accompanying drawings. FIG. 1 is a schematic diagram illustrating a system configuration according to a first embodiment. In FIG. 1, at least one image forming apparatus 10 and at least one user terminal 20 are connected via a (wired or wireless) network such as a local area network (LAN) in order to communicate with each other.

The image forming apparatus 10 is a multifunction peripheral including two or more functions such as printing, scanning, copying, and facsimile transmission and reception. Note that an apparatus, which has any one of such functions, may be used as the image forming apparatus 10.

The user terminal 20 is a computer which functions as a remote user interface for the image forming apparatus 10. The user terminal includes an input unit such as a mouse, a keyboard, a button or a touch panel and a display unit such as a liquid-crystal display. A personal computer (PC), a cell phone, a smartphone, a tablet terminal, a personal digital assistance (PDA) or the like may be used as the user terminal 20.

Figure 2:
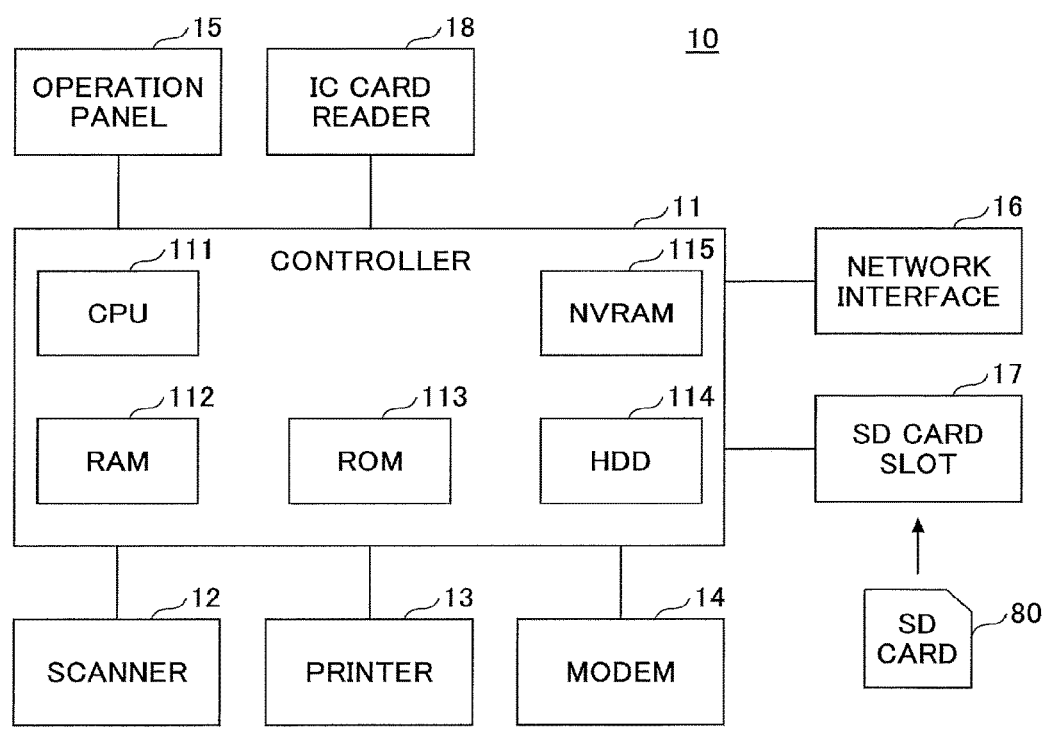
FIG. 2 is a schematic diagram illustrating an example of a hardware configuration of an image forming apparatus according to the first embodiment.

FIG. 2 is a schematic diagram illustrating an example of a hardware configuration of the image forming apparatus according to the first embodiment. In FIG. 2, the image forming apparatus 10 includes hardware such as a controller 11, a scanner 12, a printer 13, a modem 14, an operation panel 15, a network interface 16, a SD card slot 17, and an IC card reader 18.

The controller 11 includes a CPU (Central Processing Unit) 111, a RAM (Random Access Memory) 112, a ROM (Read Only Memory) 113, a HDD (Hard Disk Drive) 114 and a NVRAM (Non-Volatile Random Access Memory) 115. Various programs and data used by the programs are stored in the ROM 113. The RAM 112 is used, for example, as a storage space for loading programs and a work space at which the loaded programs are processed. The CPU 111 achieves various functions of the image forming apparatus 10 by processing the programs loaded on the RAM 112. The HDD 114 stores various programs and data used by the programs. The NVRAM 115 stores, for example, various setting information.

The scanner 12 is a hardware component (image reading unit) for reading image data from a document. The printer 13 is a hardware component (printing unit) for printing print data on printing paper. The modem 14 is a hardware component for connecting to a telephone line and is used to send and receive image data through facsimile communications. The operation panel 15 is a hardware component including an input unit such as buttons for receiving input from a user and a display part such as a liquid crystal panel. The network interface 16 is a hardware component for connecting to a (wired or wireless) network such as LAN. The SD card slot 17 is used for reading programs recorded on a SD card 80. According to the image forming apparatus 10, in addition to the programs stored in the ROM 113, programs stored in the SD card 80 may be loaded into the RAM 112 and executed. Note that any other recording medium (for example, a CD-ROM or a Universal Serial Bus (USB) memory may be used instead of the SD card 80. That is, a recording medium that can be mounted on the image forming apparatus 10 is not limited to the SD card 80. In this case, the SD card slot 17 may be replaced with a hardware component corresponding to a type of the recording medium. IC card reader 18 reads a card ID from IC cards issued to respective users. The card IDs are respective identification information. According to the first embodiment, the card ID is used as identification information for respective users.

Figure 3:
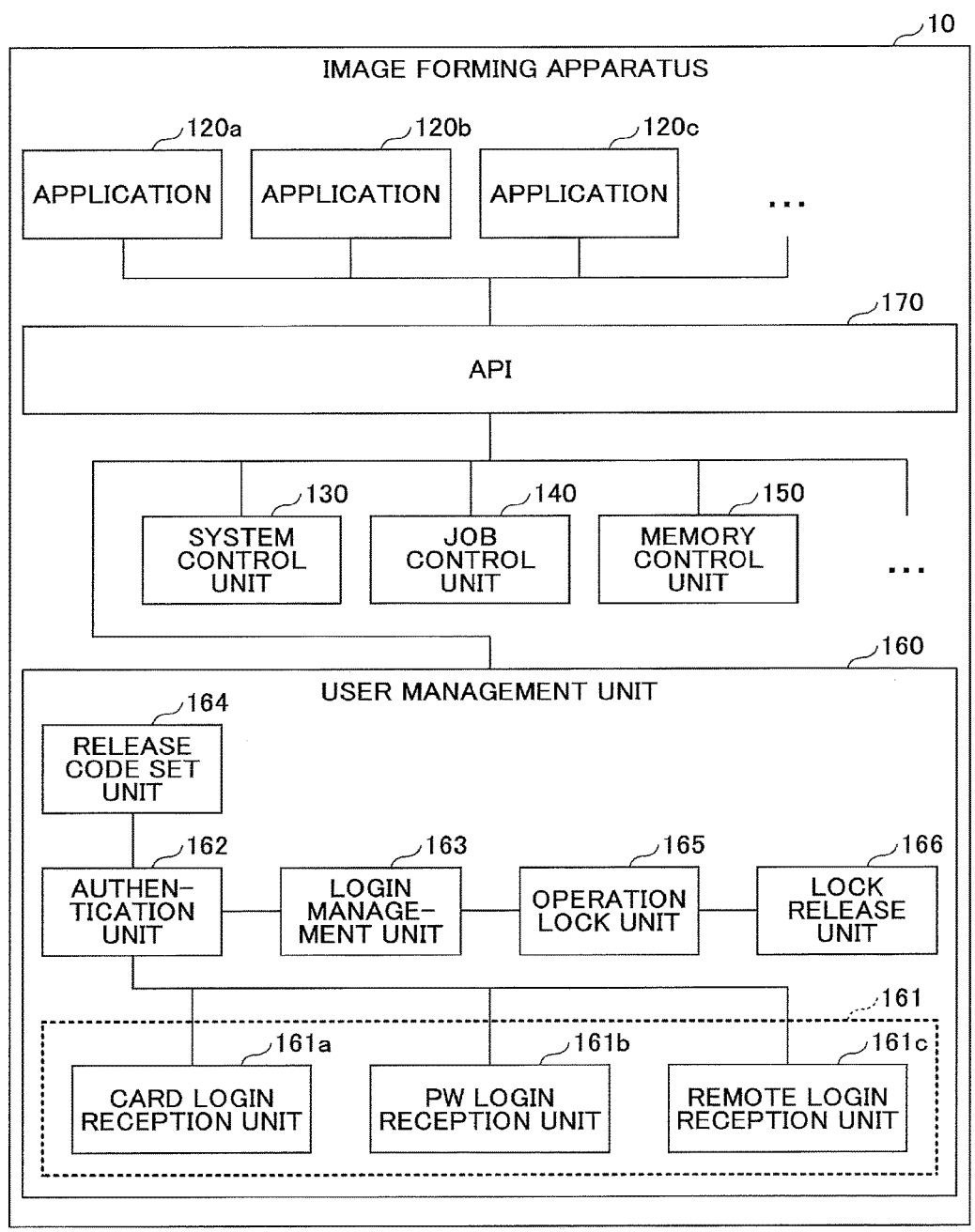
FIG. 3 is a schematic diagram illustrating a functional configuration of the image forming apparatus.

FIG. 3 is a schematic diagram illustrating a functional configuration of the image forming apparatus 10. As illustrated in FIG. 3, the image forming apparatus 10 includes, at least one application 120 including, an application 120a, an application 120b, and an application 120c, a system control unit 130, a job control unit 140, a memory control unit 150, a user management unit 160 or the like. These units may be implemented by processes which are executed by the CPU 111 based on at least one program installed in the image forming apparatus 10.

The application 120 is an application program that causes the image forming apparatus 10 to execute a process relating to a function of the application 120. For example, the application 120 causes the image forming apparatus 10 to execute scanning, printing, copying and facsimile transmission and reception The system control unit 130 controls an overall operation of the image forming apparatus 10. The job control unit 140 controls a job executed by the image forming apparatus 10. A scanning job, a printing job, a copying job, a facsimile transmission job and a facsimile reception job may be an example of the job executed by the image forming apparatus 10. The memory control unit 150 controls use of the RAM 112 by the software, such as the application 120 or the like.

The user management unit 160, for example, authenticates a user of the image forming apparatus 10 and manages (controls) a login state of the authenticated user. For example, as illustrated in FIG. 3, the user management unit 160 may include a card login reception unit 161a, a password (PW) login reception unit 161b, a remote login reception unit 161c, an authentication unit 162, a login management unit 163, a release code set unit 164, an operation lock unit 165 and a lock release unit 166.

The card login reception unit 161a receives an input of user information corresponding to a login with the IC card (referred to as "the card login" hereinafter). For example, the card login reception unit 161a reads out a card ID from an IC card set on the IC card reader 18. Thus, the card ID is an example of the user information when the card login is executed.

The PW login reception unit 161b receives an input of user information corresponding to a login with a user name and a password (referred to as "the password login" hereinafter). For example, the PW login reception unit 161b receives inputs of the user name and the password via a login screen displayed on the operation panel 15. Thus, the user name and the password is an example of the user information when the password login is executed.

The remote login reception unit 161c receives input of user information corresponding to a login via the network (referred to as "the remote login" hereinafter). Note that, "remote" of "the remote login" indicates the connection state via the network, regardless of a length of a distance. For example, the remote login reception unit 161c receives user information transmitted from the user terminal 20 via the network and extracts user information from print data received via the network. The user information may be a user name, a password and other identification information.

A reception of user information corresponding to biometric authentication and other authentication methods may be executed. In the following, the card login reception unit 161a, the PW login reception unit 161b and the remote login reception unit 161c are referred to as "the login reception unit 161", when there is no need to distinguish each of them.

The authentication unit 162 executes an authentication process for determining whether a login to the image forming apparatus 10 is permitted with regard to user information received by the login reception unit 161. For example, the authentication unit 162 executes the authentication process with regard to user information received by the login reception unit 161 by collating user information received by the login reception unit 161 with correct user information previously stored in the HDD 114 or a computer connected via the network.

The login management unit 163 identifies a login user (an operator) of the image forming apparatus 10 by managing the login state of the user with regard to user who is permitted to login to the image forming apparatus 10 (referred to as "the login user" hereinafter) For example, the login management unit 163 may stores user names of the login user into RAM 112. When a user executes the card login or the like, the user name, for example, may be specified based on correspondence information of the card ID and the user name.

According to the first embodiment, even when a login state of one user is continued, the image forming apparatus 10 permits an interruptive login of another user (referred to as "the interruptive login" hereinafter). The login management unit 163 basically identifies a login user who is a current operator, based on the last user information authenticated by the authentication unit 162. In the following, the login user, who is the current operator, is referred to as "the current user" hereinafter in particular. Thus, while the interruptive login is continued, the login management unit 163 identifies the current user based on input user information which is input related to the interruptive login. When the user, who executed an interruptive login (referred to as "the interruptive user" hereinafter), executes a logout, the login management unit 163 identifies the current user based on the user information of the user who is interrupted. Note that a user who logs in to the image forming apparatus 10, in a state in which a login of another user to the image forming apparatus 10 is not executed, may be referred to as "the primary user" hereinafter for convenience.

The release code set unit 164 executes a setting of a release code. The release code may be a character string or a symbol string (arrangement of symbols) which is requested to input in the image forming apparatus 10. The release code may be used for preventing an unauthorized use by a user except the user who is interrupted. Symbols usable for the release code may be symbols, which is able to be input via a keyboard displayed on the operation panel 15, or may be limited to specific symbols. According to the first embodiment, an arbitrary symbol string may be set to the release code by the authorized user when a login is executed. The release code set unit 164 may store the release code set by the user in the RAM 112 or the HDD 114.

The operation lock unit 165 starts imposing restriction of use of the image forming apparatus 10 at a predetermined timing in a case that the interruptive login is executed. The predetermined timing is, for example, a timing at which a logout of the interruptive user is executed. For example, the operation lock unit 165 superimposes a screen for inputting the release code (referred to as "the lock screen" hereinafter) on an operation screen displayed on the operation panel 15. Basically, the lock screen is not deleted (non-display) until the correct release code is input. Thus, displaying the lock screen on the operation panel 15 substantially restricts the use of the image forming apparatus 10 until the correct release code is input. For example, a detail of the restriction of the use may be a detail, in which an operation except an operation through the lock screen is not permit. However, some functions, such as information browsing stored in the image forming apparatus 10, may be permitted.

The lock release unit 166 releases the use of the image forming apparatus 10 (finish the restriction of the use) in a case that the correct release code is input while the use of the image forming apparatus 10 is restricted. More specifically, the lock release unit 166 deletes the lock screen in order to make a screen, which is hidden under the lock screen, operable.

In the following, processing procedures executed by the image forming apparatus 10 is described. FIG. 4 is a sequence chart for illustrating an example of processing procedures executed by the image forming apparatus 10 according to the first embodiment. In FIG. 4, the user A is the primary user and the user B is the interruptive user. In the first embodiment, the user A is an example of a first user and user B is an example of a second user.

When the user A inputs user information in a state in which a login screen is displayed on the operation panel 15, the card login reception unit 161*a* or the PW login reception unit 161*b* receives the user information (step S110)

Figure 5C:
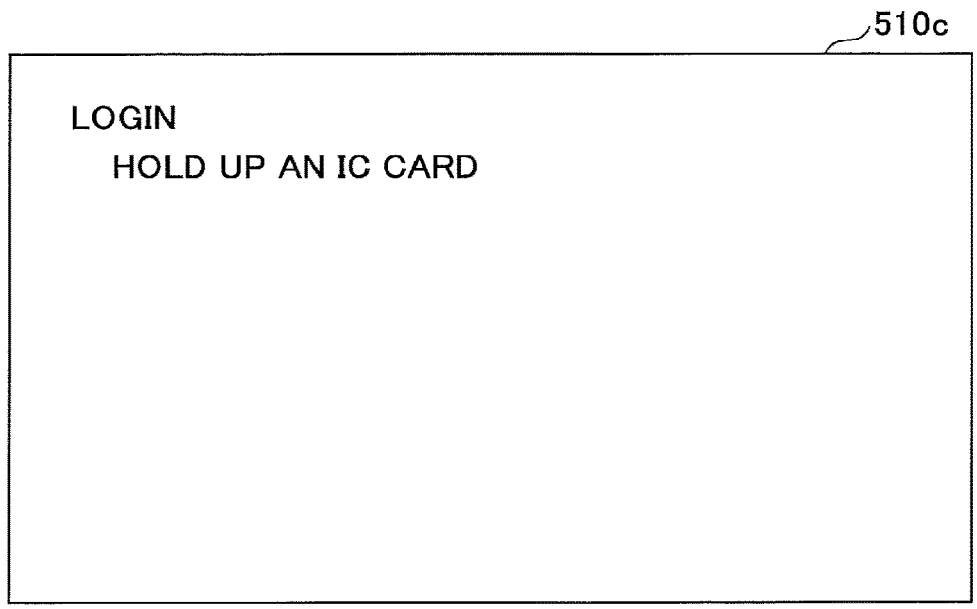

FIGS. 5A, 5B, and 5C are diagrams illustrating examples of login screens. The login screen 510*a*, 510*b*, and 510*c*, which are examples of the login screens 510, are shown in FIGS. 5A, 5B, and 5C.

The login screen 510*a* shown in FIG. 5A is an example of the login screen 510 when a user name and a password, which are input manually, are used as user information for being authorized. When Input buttons, which correspond to input areas of the user name or the password, are pushed, a specification screen of the character string such as keyboards, is displayed, resulting in the user name or the password can being input. The user information which is input via the login screen 510*a* is received by the PW login reception unit 161*b*.

The login screen 510*b* shown in FIG. 5B is an example of the login screen 510 when a card ID, which is stored in a contact type IC card, is used as user information for being authorized. When the contact type IC card is inserted into the IC card reader 18, the card ID stored in the contact type IC card is read as the user information.

The login screen 510*c* shown in FIG. 5C is an example of the login screen 510 when a card ID, which is stored in a non-contact type IC card, are used as user information for being authorized. When the non-contact type IC card is held up to the IC card reader 18, the card ID stored in the non-contact type IC card is read as the user information.

Note that the user information, which is read from the IC card, is received by the card login reception unit 161*a* when the login screen 510*b* or the login screen 510*c* is displayed.

Subsequently, the authentication unit 162 executes an authentication process based on the received user information, to determine whether a login of the user A is permitted. In a case that the authentication process executed by the authentication unit 162 has failed, remaining processes are stopped. In a case that the authentication process executed by the authentication unit 162 has succeeded, the login management unit 163 determines whether there is a login user. For example, such determination may be executed based on whether user management information is stored in a predetermined are of the RAM 112. The user management information may include, for example, a user name of a login user and information of access control of a login user.

When the IC card login is executed, the authentication unit 162 may further request the user to input the password. In this case, the authentication unit 162, for example, may display a password input screen to receive input of the password via the password input screen.

Figure 6:
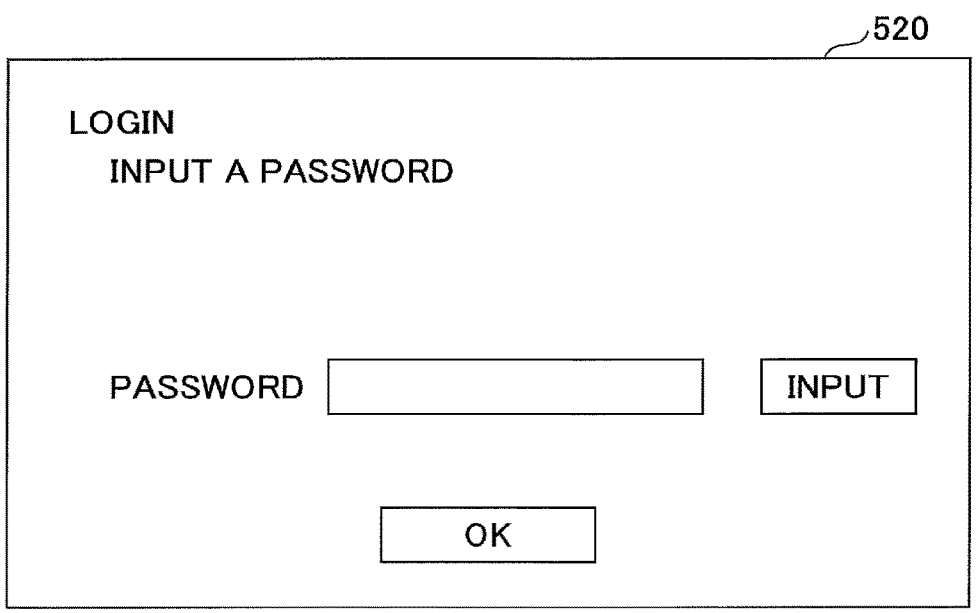
FIG. 6 is a diagram illustrating an example of a password input screen.

FIG. 6 is a diagram illustrating an example of the password input screen. As illustrated in FIG. 6, a password input screen 520 has a structure in which an input area of the user name is eliminated from the login screen 510*a* illustrated in FIG. 5A.

When the authentication of the authentication unit 162 has succeeded and a login user does not exist, the release code set unit 164 displays a screen for inputting the release code (referred to as "the release code input screen" hereinafter) on the operation panel 15 (step S120).

FIGS. 7A and 7B are diagrams illustrating examples of release code set screens. The release code set screen 530*a* and 530*b*, which are examples of the release code set screens 530, are shown in FIG. 7.

The release code set screen 530*a* shown in FIG. 7A is an example of the release code set screen 530 for setting the release code with a four digit number. The release code set screen 530*b* shown in FIG. 7B is an example of the release code set screen 530 for setting the release code with an eight digit number. Although the ten key, which is contained in the release code set screen 530 is illustrated in FIGS. 7A and 7B, is used for inputting of the release code, when a keyboard (such as a ten key) of the hardware component is provided on the operation panel 15, the keyboard of the hardware component may be used for inputting the release code. Note that symbols other than numerical symbols may be used for inputting the release code.

When the release code is input via the release code set screen 530 and an OK button is pushed (step S130), the release code set unit 164 may store the input release code, for example, in the RAM 112. Note that the release code set unit 164 may display a screen for making the user A to confirm the release code (referred to as "the release code confirm screen" hereinafter) on the operation panel 15 after the release code set unit 164 stores the release code. In the first embodiment, the release code input in step S130 is an example of first input information which is arbitrarily set in conjunction with a login of the user A.

Figure 8:
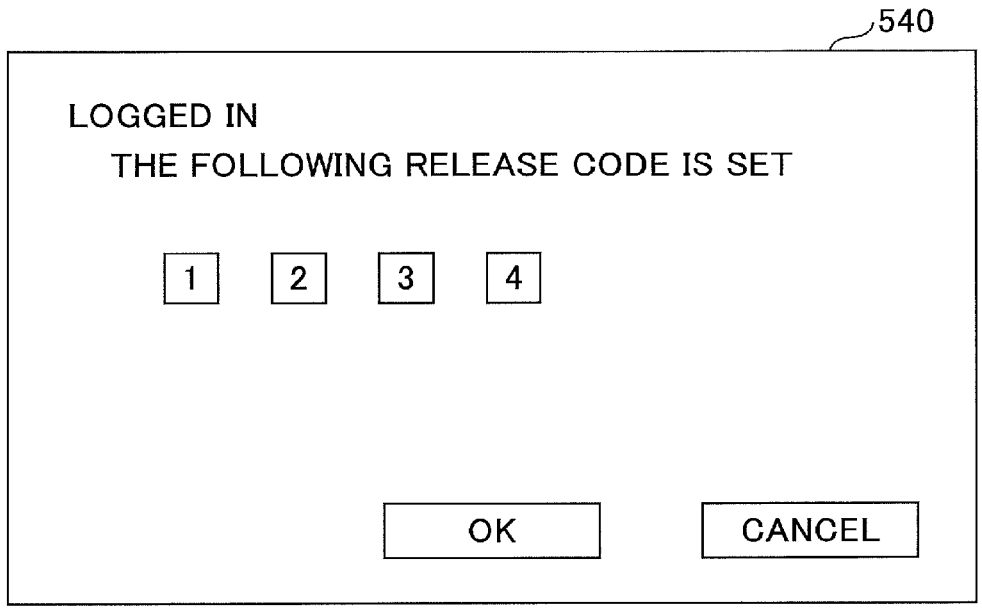
FIG. 8 is a diagram illustrating an example of a release code confirm screen.

FIG. 8 is a diagram illustrating an example of the release code confirm screen. As illustrated in FIG. 8, the release code, which is set by the user A, is displayed on a release code confirm screen 540. The user A may push the OK button if the release code is displayed as intended. In this case, the release code may be determined in response to the pushing of the OK button. If the CANCEL button is pushed, the release code set screen 530 is displayed again. In this case, the user A may set the release code again.

Subsequently, the login management unit 163 permits the login of the user A (step S140). At that time, the login management unit 163 may store user management information, which includes the user name of the user A and the release code stored based on step S130 and the like, in the RAM 112 as the user management information of the primary user.

After that, the user B may try to login to the image forming apparatus 10 in a state in which the login state of the user A is continued. For example, the user B may try to use a copy function while the user A is executing a large number of copies. For example, the login screen 510 may be displayed when the user B executes a predetermined operation via the operation panel 15. When the user B requests a login to the image forming apparatus by inputting user information (step S150), the authentication unit 162 executes an authentication process with regard to the user information. When the authentication process executed by the authentication unit 162 succeeded, the login management unit 163 determines whether there is a login user. In this case, the user management information of the user A is stored. Thus, the login management unit 163 determines that the login of the user B is an interruptive login, and permits the interruptive login (step S160). At that time, the login management unit 163 may store user management information, which includes the user name of the user B and the like, in the RAM 112 as the user management information of the interruptive user.

Subsequently, the user B may input, for example, a job execution request with regard to the application 120a, to the image forming apparatus 10 (step S170). When the job execution request is input, setting information of the job may also be input. The setting information of the job may be, for example, setting information with regard to a copy (a resolution, monochrome or color, the number of intensive pages, one side or both sides, the number of copies, and a size of the sheet) if the job is a copy job. Note that the job may be an executed process by using resources of the image forming apparatus 10 (hardware resources and software resources) for satisfying a request from a user.

In response to the job execution request, the application 120a inputs the job execution request with regard to a function of the application 120a in the job control unit 140 (step S180). For example, if the application 120a is the application 120 for copying, the job execution request of the copy job is input in the job control unit 140. The job execution request may include the user name of the current user (in this case, use B) in addition to the job setting information. However, the user name may be specified by the job control unit 140. At that time, the application 120a stores that the job of the current user is under execution until the end of the job is notified from the job control unit 140. The current user may be specified by inquiring of the login management unit 163. In other words, in a case that user management information of the interruptive user is stored, the login management unit 163 returns the user name contained in the user management information in response to the inquiry with regard to the current user. In a case that user management information of the interruptive user is not stored, the login management unit 163 returns the user name contained in the user management information of the primary user in response to the inquiry with regard to the current user. Thus, in this case, the user name of the user B, who is the interruptive user, is returned. As a result, for example, log information, which is stored with regard to the job, may include the user name of the user B.

The job control unit 140 may request a device, which is necessary for the execution of the job with regard to the job execution request, to execute the job (step S190). The device executes the requested job. For example, the device may be the scanner 12 and the printer 13 or the like in a case that the job is a copy job.

When the job of the device ends (step S200), the job control unit 140 notifies the application 120a of the end of the execution of the job with regard to the user B (step S210).

After that, when the user B performs a predetermined operation and input a request of logout in the image forming apparatus 10 (step S220), the login management unit 163 executes a release process (referred to as "the interruptive logout" hereinafter) of the interruptive login (step S230). At that time, the login management unit 163 deletes the user management information of the interruptive user.

Subsequently, the operation lock unit 165 displays the lock screen on the operation panel 15 to start imposing the restriction of use of the image forming apparatus 10 (step S240). In other words, the operation lock unit 165 starts restricting the use of the image forming apparatus 10 by displaying the lock screen on the operation panel 15 at a predetermined timing in a case that the user B logs in to the image forming apparatus 10 while a login state of the user A is continued. In the first embodiment, a timing in which the interruptive logout is executed is an example of the predetermining timing.

Figure 9A:
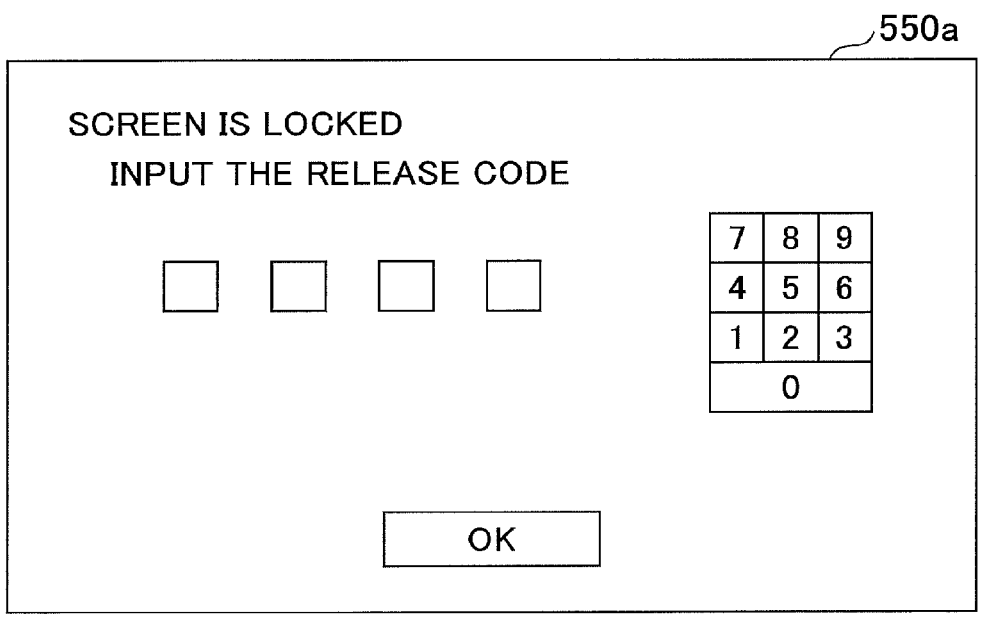
FIGS. 9A, 9B, and 9C are diagrams illustrating examples of lock screens.
Figure 9B:
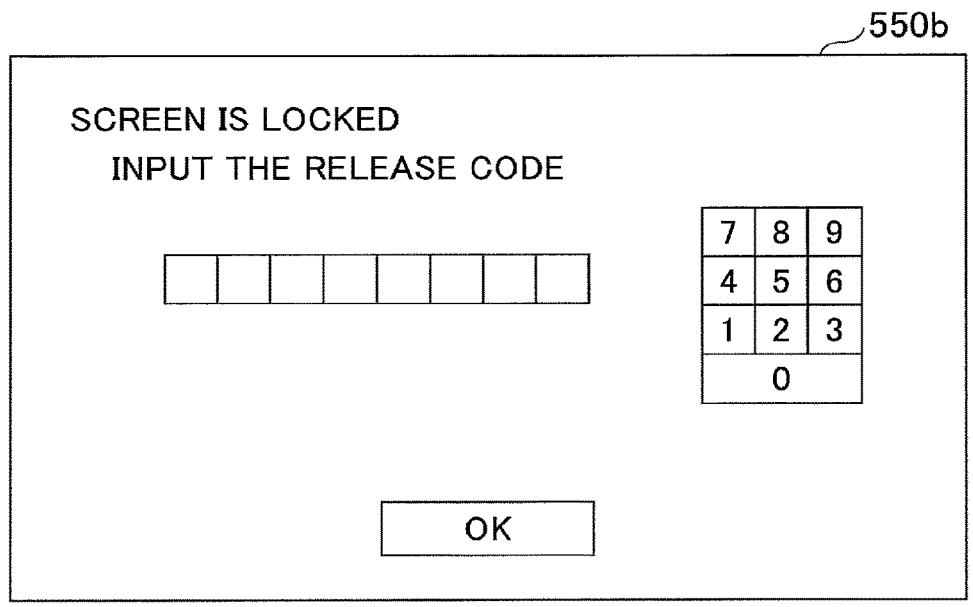
Figure 9C:
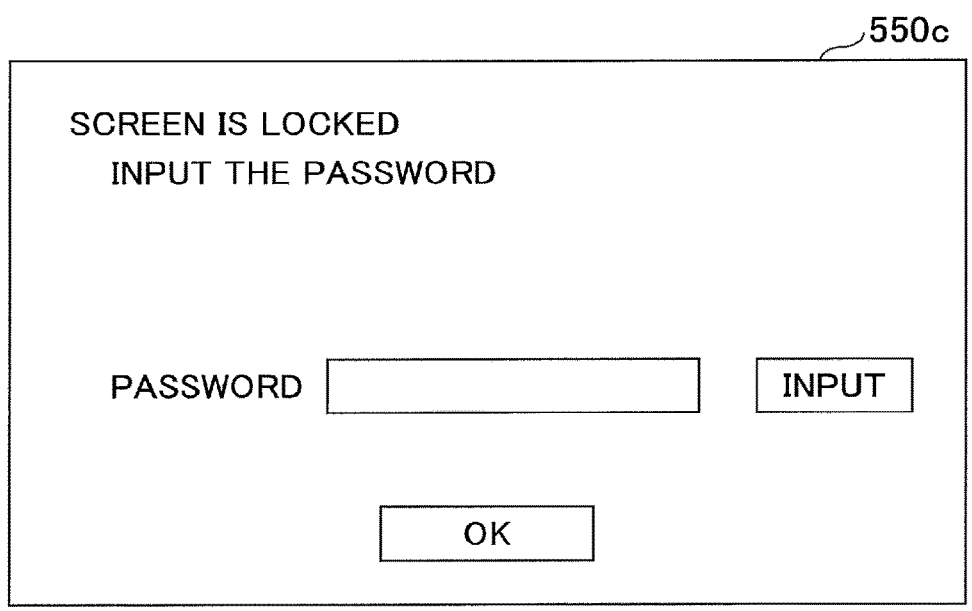

FIGS. 9A, 9B, and 9C are diagrams illustrating examples of lock screens. Examples of the lock screen 550a, 550b, and 550c are shown in FIGS. 9A, 9B, and 9C. Each of the lock screens 550 enables a user to input the release code for deleting the lock screen 550.

The lock screen 550a shown in FIG. 9A is an example of the lock screen 550 corresponding to the release code of the four digit number. The lock screen 550b shown in FIG. 9B is an example of the lock screen 550 corresponding to the release code of the eight digit number. The lock screen 550c shown in FIG. 9C is an example of the lock screen 550 in a case that the password of the user is used as the release code. Thus, the password, which is used for the login, is input in the lock screen 550c. In this case, the setting of the release code via the release code set screen 530 may not be executed.

Note that the lock screen 550 may be used merely for locking an operation of the screen, and the input of the release code may be executed via another screen. The other screen may be superimposed on the lock screen 550. In other words, the lock screen 550 is a screen for requiring the input of the release code.

When the release code is input via the lock screen 550 (step S250), the lock release unit 166 compares the release code that is input with the release code contained in the user management information of the primary user. In a case that they both coincide, the lock release unit 166 deletes the lock screen 550 (step S260). In the first embodiment, the correct release code that is input in step S250 is an example of second input information. In response to the input of the correct release code (the second input information), which matches the release code set (the first input information) in step S130, lock release unit 166 releases the restriction of use of the image forming apparatus 10.

On the other hand, in a case that they both do not coincide, the lock screen 550 does not delete the lock screen 550. In this case, the restriction of the image forming apparatus 10 is continued. Thus, if a user other than the user A tries to use the image forming apparatus 10, the user cannot use the image forming apparatus 10 unless the user inputs the correct release code. At that time, the current user of the image forming apparatus 10 is the user A, and it is not preferable to permit a user other than the user A to use the image forming apparatus 10 in terms of security or the like. For example, it is not preferable that while a user (the correct user), who executed a copy function previously, is away from the image forming apparatus, the image forming apparatus is used improperly by a user who pretends to be the correct user. In particular, in an image forming apparatus that performs a charge for a job, to charge appropriately becomes difficult. However it is sometimes inconvenient to make a login to the image forming apparatus exclusive for improving security (in other words, do not permit the interruptive login). For example, in a case that a user who executed the login forgets to log out from the image forming apparatus, the image forming apparatus cannot be used by another user even though the image forming apparatus itself is in a state in which the image forming apparatus can execute jobs.

When the correct release code is input and the lock screen 550 is deleted, the user A may start the use of the image forming apparatus 10 again. For example, the user A may make the image forming apparatus 10 execute a job with regard to the application 120a (step S270 to S310). Note that processing procedures in step S270 to S310 may be similar to processing procedures in step S170 to S210.

Subsequently, when the user A executes a logout operation (step S320), the login management unit 163 executes the logout process of the primary user (step S330). At that time, the login management unit 163 deletes the user management information of the primary user from the RAM 112. The login screen 510 may be displayed on the operation panel 15 after the logout process.

Note that the interruptive login of may be permitted in two or more hierarchies. For example, in a state in which the interruptive login of the user B is continued, the interruptive login of a use C may be permitted. According to such configuration, the user management information may be managed by a hierarchical structure such as a stack form, and a user corresponding to the uppermost user management information may be identified as the current user. In this case, the lock screen 550 is displayed when the user C executes a logout. When the release code corresponding to the user B is input in the lock screen 550, the lock screen 550 may be deleted and the user B may be identified as the current user. Furthermore, a user, who is corresponding to the release code input in the lock screen 550, may be identified as the current user. For example, in a case that a input release code which is input is corresponding to the user B, the user B may be identified as the current user, and in a case that a release code which is input is corresponding to the user A, the user A may be identified as the current user.

As mentioned above, according to the first embodiment, the primary user returns as the current user of the image forming apparatus 10 (the current operator) by an easy operation such as an inputting of the release code. Thus, an operation load for preventing the unauthorized use may be reduced. In particular, if the number of digits of the release code is shorter than the number of digits of the password, effect of a reduction of the operation load becomes prominent.

In addition, because the release code is set by the user A, it is difficult for another user to know the release code. Thus, for a period of time in which the lock screen 550 is displayed after the logout of the interruptive user is executed, it is difficult for the other user to pretend to be the primary user for using the image forming apparatus 10. Further, according to the first embodiment, the user authentication is also executed when the interruptive login is executed. Thus, the first embodiment may prevent the improper job executions by a user who does not have use authority.

Next, a second embodiment is described. In the following, differences between the second embodiment and the first embodiment are described. Features of the second embodiment, which are not specifically described, may be the same features of the first embodiment.

FIG. 10 is a sequence chart for illustrating an example of processing procedures executed by the image forming apparatus according to the second embodiment. In FIG. 10, the same step numbers as those in FIG. 4 are referred to by the same step numbers, and their description is appropriately omitted.

As illustrated in FIG. 10, when the job requested by the user B, who is the interruptive user, ends (step S210), the job control unit 140 also notifies the login management unit 163 of the end of the job (step S211). In response to the notification of the end of the job, the login management unit 163 executes the interruptive logout process (step S230). At that time, the login management unit 163 deletes the user management information of the interruptive user. In other words, the second embodiment starts restricting of the use of the image forming apparatus at a timing in which a process requested by the user B is finished while a login state of the user B is continued.

Thus, according to the second embodiment, the interruptive user is logged out forcibly at a timing in which the job requested by the interruptive user ends. As a result, the second embodiment may prevent the interruptive user from forgetting the logout.

Next, a third embodiment is described. In the following, differences between the third embodiment and the second embodiment are described. Features of the third embodiment, which are not specifically described, may be the same features of the second embodiment.

FIG. 11 is a sequence chart for illustrating an example of processing procedures executed by the image forming apparatus 10 according to the third embodiment. In FIG. 11, the same step numbers as those in FIG. 10 are referred to by the same step numbers, and their description is omitted. In FIG. 11, step S212 and step S213 are added as processes subsequent to step S211.

In step S212, the login management unit 163 inquires of the application 120a, which executed the job requested by the user B, whether the logged out is permitted. The application 120a responds about whether the logged out is permitted (step S213), based on a log record, an execution state of a post-processing which is executed after the execution of the job, and the like. For example, the application 120a responds that the logout is permitted if the post-processing has finished, and the application 120a responds that the logout is not permitted if the post-processing has not been finished.

Steps subsequent to Step S230 are executed if a response from the application 120a indicates that the logout is permitted. On the other hand, executions of the steps subsequent to step S230 are stayed if a response from the application 120a indicates that the logout is not permitted. For example, step S212 and S213 are periodically repeated until the respond, which indicates that the logout is permitted, is executed. If the number of repeated times is reaches the limit, the steps subsequent to step S230 may be executed.

According to the third embodiment, the execution of the forcible logout may be avoided before the job requested by the interruptive user ends completely. The inquiry in step S212 may be executed to each of the applications 120 which execute the job requested by the user B other than the application 120a.

Next, a fourth embodiment is described. In the following, differences between the fourth embodiment and other embodiments (the first to the third embodiment) are described. Features of the fourth embodiment, which are not specifically described, may be the same features of the other embodiments.

FIG. 12 is a sequence chart for illustrating an example of processing procedures executed by the image forming apparatus according to the fourth embodiment. In FIG. 12, the same step numbers as those in FIG. 11 are referred to by the same step numbers, and their description is appropriately omitted. In FIG. 12, step S121 and S122 are executed instead of the step S120 and S130.

The release code set unit 164 generates a release code when authentication of the authentication unit 162 is succeeded and a login user does not exist. The release code set unit 164 displays the generated release code on the operation panel 15 (step S121). For example, a generated release code, which is contained in the release code confirm screen 540 illustrated in FIG. 8, is displayed. It is preferable to generate a release code in a random manner.

When the OK button is pushed in the release code confirm screen 540, the login management unit 163 permits a login of the user A (step S140). The login management unit 163 may store user management information, which includes the user name of the user A, the generated release code stored and the like, on the RAM 112 as the user management information of the primary information.

According to the fourth embodiment, it is unnecessary for the primary user to set the release code. Thus, the setting load of the release code may be reduced.

Next, a fifth embodiment is described. In the following, differences between the fifth embodiment and other embodiments (the first to the fourth embodiment) are described. Features of the fifth embodiment, which are not specifically described, may be the same features of the other embodiments. In FIG. 13, a user A is the current user.

FIG. 13 is a sequence chart for illustrating an example of processing procedures executed by the image forming apparatus according to the fifth embodiment. In FIG. 13, the same step numbers as those in FIG. 12 are referred to by the same step numbers, and their description is appropriately omitted.

In step S141 to S145, a job requested by the user A is executed as well as the above described step S270 to S310. Subsequent to step S145, the job control unit 140 notifies the login management unit 163 of the end of the job (step S146).

In step S261 to S263, processes, which are similar to the above described step S240 to S260, are executed. Step S240 to S260 are described above. Thus, the release code is input by the user A. When the release code is correct, the user A may continue to use the image forming apparatus 10. For example, a job requested by the user A is executed as shown in step S270 to S310.

Subsequently, input of the release code is requested to the user A as well as step S146 and S149 (step S311 and step S315). Thus, according to the fifth embodiment, the input of the release code is requested every time the execution of the job ends with regard to the primary user. In other words, the fifth embodiment starts restricting of the use of the image forming apparatus every time a process requested by the user A is finished. After that, when the user A executes the logout operation (step S320), the logout process is executed (step S330).

As described above, the fifth embodiment may prevent the unauthorized use by another user even if the primary user forgets to logout.

Next, a sixth embodiment is described. In the following, differences between the sixth embodiment and other embodiments (the first to the fifth embodiment) are described. Features of the sixth embodiment, which are not specifically described, may be the same features of the other embodiments.

FIG. 14 is a sequence chart for illustrating an example of processing procedures executed by the image forming apparatus according to the sixth embodiment. In FIG. 14, the same step numbers as those in FIG. 4 or FIG. 10 to FIG. 13 are referred to by the same step numbers, and their description is appropriately omitted.

Subsequent to step S146, which is described in FIG. 13, step S147 and S148 are executed as shown in FIG. 14.

In response to the notification with regard to the end of the job in step S146, the operation lock unit 165 inquires of the application 120a, which executed the job requested by the user A, whether a displaying of the lock screen 550 is permitted (step S147). The application 120a may determine whether the displaying of the lock screen 550 is permitted, based on a determination criteria similar to a determination criteria of the logout propriety or the like. The application 120a responds about the result of the determination (step S148).

Steps subsequent to step S261 are executed if a response from the application 120a indicates that the displaying of the lock screen 550 is permitted. Executions of steps subsequent to step S261 are waited if a response from the application 120a indicates that the displaying of the lock screen 550 is not permitted. For example, step S147 and S148 are periodically repeated until the respond, which indicates that the displaying of the lock screen 550 is permitted, is executed. If the number of repeated times reaches the limit, steps subsequent to step S261 may be executed.

Step S312 and S313, which are subsequent to step S311, may be processes similar to processes in step S147 to S148.

According to the sixth embodiment, the execution of the forcible displaying of the lock screen 550 may be avoided before processes relating to the job requested by the interruptive user ends completely. Thus, for example, the interruptive user may confirm that, before the lock screen 550 is displayed, a job ends normally or abnormality of a job occurs. The inquiry in step S147 and step S312 may be executed to each of the applications 120 which execute the job requested by the user B other than the application 120a.

Next, a seventh embodiment is described. In the following, differences between the seventh embodiment and the sixth embodiment are described. Features of the seventh embodiment, which are not specifically described, may be the same features of the sixth embodiment.

FIG. 15 is a sequence chart for illustrating an example of processing procedures executed by the image forming apparatus 10 according to the seventh embodiment. In FIG. 15, the same step numbers as those in FIG. 14 are referred to by the same step numbers, and their description is appropriately omitted.

The seventh embodiment is different from the sixth embodiment in that the lock screen 550 is displayed in a case that an operation is not executed in a predetermined time from a time in which a job ends. In other words, the seventh embodiment start restriction the use of the image forming apparatus upon occurrence of an event that an operation of the image forming apparatus is not executed for a predetermined time period after a process requested by the user A is finished.

Thus, the operation lock unit 165 starts (counting) a timer for displaying the lock screen 550 (referred to as "the lock screen displaying timer" hereinafter) in response to a response from the application 120a indicates that the displaying of the lock screen 550 is permitted (step S148, step S312). The lock screen displaying timer takes a time-out in a case that an operation of the image forming apparatus 10 is not executed for a predetermined time period after the lock screen displaying timer starts counting. In response to the time-out, the operation lock unit 165 displays the lock screen 550 on the operation panel 15 (step S261).

On the other hand, in a case that some operation is executed before the period of time-out time of the lock screen displaying timer passes (before take the time-out) from the start time of the lock screen displaying timer, the image forming apparatus 10 executes a process in response to the operation.

For example, in a case that a logout operation is executed (step 320) before the period of time-out time of the lock screen displaying timer passes from step S313, the logout process is executed (step S330).

The lock screen displaying timer may start at a timing other than a timing after the execution of the job. For example, a time-out time of the lock screen displaying timer may be measured from a timing in which the last operation is executed.

Thus the seventh embodiment may reduce a possibility that the input of the release code is requested every time the jobs are executed when the user wants to cause the image forming apparatus 10 to execute a plurality of jobs.

Next, an eighth embodiment is described. In the following, differences between the eighth embodiment and the seventh embodiment are described. Features of the eighth embodiment, which are not specifically described, may be the same features of the seventh embodiment.

FIG. 16 is a sequence chart for illustrating an example of processing procedures executed by the image forming apparatus according to the eighth embodiment. In FIG. 16, the same step numbers as those in FIG. 15 are referred to by the same step numbers, and their description is appropriately omitted. In FIG. 16, an example of processing procedures, which are executed when a release code input in step S262 is incorrect (differing from a release code stored with regard to the primary user), is illustrated.

When the release code, which is input, is incorrect, the operation lock unit 165 displays the lock screen 550 again (step S264).

FIGS. 17A and 17B are screen examples that are displayed in response to the input of the incorrect release code. The lock screen 550a and 550b, which are examples of the lock screens 550, are shown in FIG. 17.

The lock screen 550d shown in FIG. 17A includes a message for prompting a user to execute a logout when a password is forgotten and a "logout" button. The lock screen shown in FIG. 17B includes 550e includes a message for prompting a user to login again when a password is forgotten and a "login" button.

For example, when the "login" button is pushed in the lock screen 550e (step S265), the login management unit 163 executes the logout process of the primary user (step S330). Subsequently, the card login reception unit 161a or the PW login reception unit 161b displays the login screen 510 (step S340).

For example, when the "logout" button is pushed in the lock screen 550d (step S265), step S330 is executed.

Note that the eighth embodiment may be combined with the first to the seventh embodiment, and the lock screen 550 shown in FIG. 17 may be displayed from the beginning in each of the first to the eighth embodiment.

Next, a ninth embodiment is described. In the following, differences between the ninth embodiment and the eighth embodiment are described. Features of the ninth embodiment, which are not specifically described, may be the same features of the eighth embodiment.

FIG. 18 is a sequence chart for illustrating an example of processing procedures executed by the image forming apparatus 10 according to the ninth embodiment. In FIG. 18, the same step numbers as those in FIG. 16 are referred to by the same step numbers, and their description is appropriately omitted. In FIG. 18, processing procedures, which are executed when an incorrect release code is input in multiple times successively, are illustrated.

After step S262, when the incorrect release code is input repeatedly and the input times of the incorrect release code exceed a predetermined upper value, the operation lock unit 165 displays a logout requesting screen on the operation panel 15 (step S267).

Figure 19A:
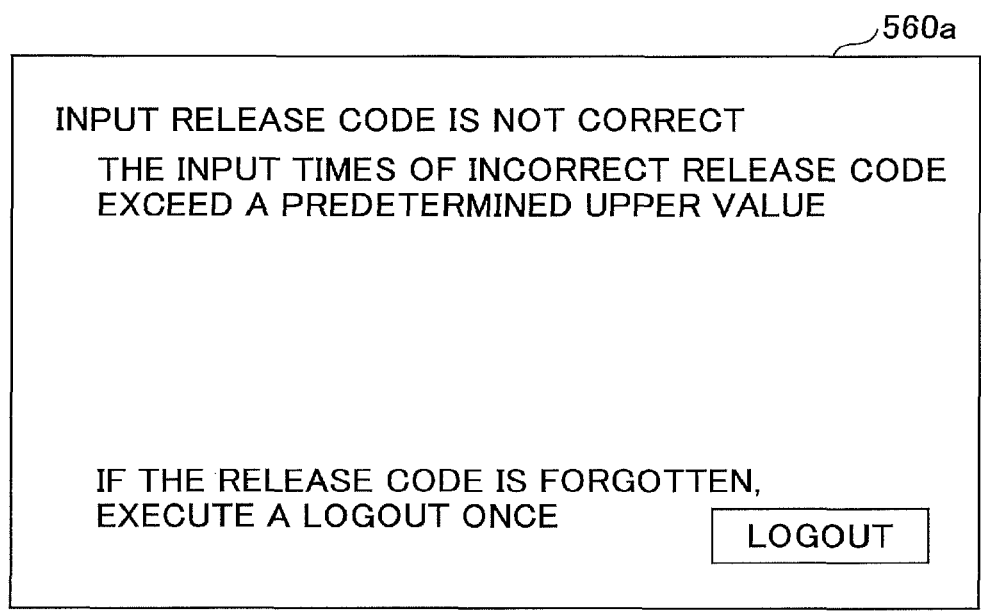
FIGS. 19A and 19B are screen examples of a logout requesting screen.
Figure 19B:
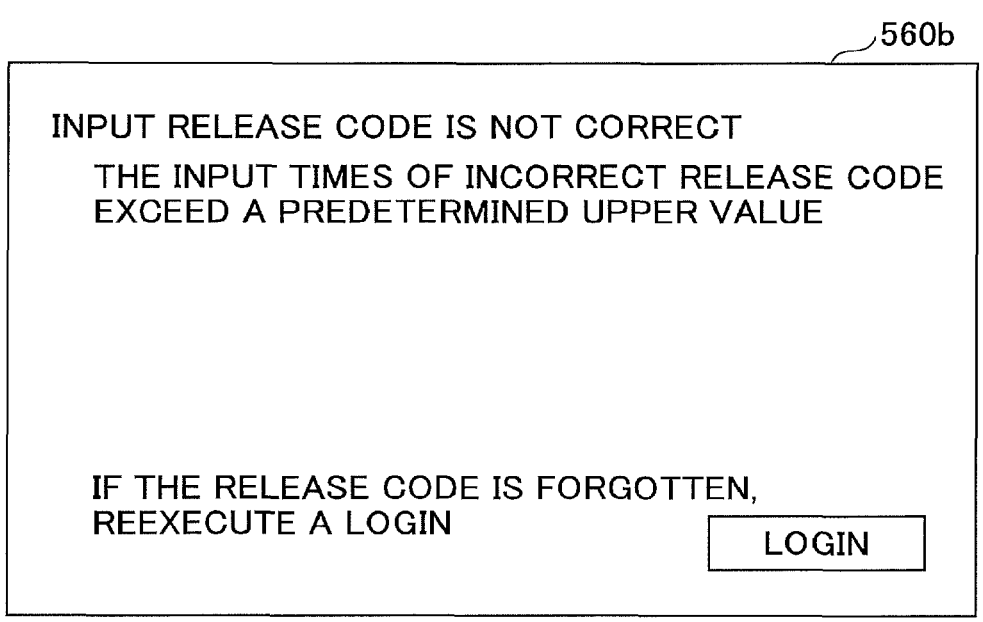

FIGS. 19A, 19B, and 19C are screen examples of the logout requesting screen. The logout requesting screens 560a and 560b, which are examples of the logout requesting screens 560, are shown in FIGS. 19A, 19B and 19C. The logout requesting screen 560a shown in FIG. 19A includes a "logout" button. The logout requesting screen 560b shown in FIG. 19B includes a "login" button.

For example, when the "logout" button is pushed in the logout requesting screen 560a (step S268), the login management unit 163 executes the logout process of the primary user (step S340).

For example, when the "login" button is pushed in the logout requesting screen 560b (step S268), the card login reception unit 161a or the PW login reception unit 161b may display the login screen 510 after the login management unit 163 executes the logout process of the primary user.

Thus the ninth embodiment may reduce a possibility that the correct release code is input accidentally in a case that a user who does not know the correct release code inputs a release code in multiple times. In other words, the ninth embodiment may reduce the possibility that the user who does not know the correct release code see through the correct release code. Note that the ninth embodiment may be combined with other embodiments.

Figure 20:
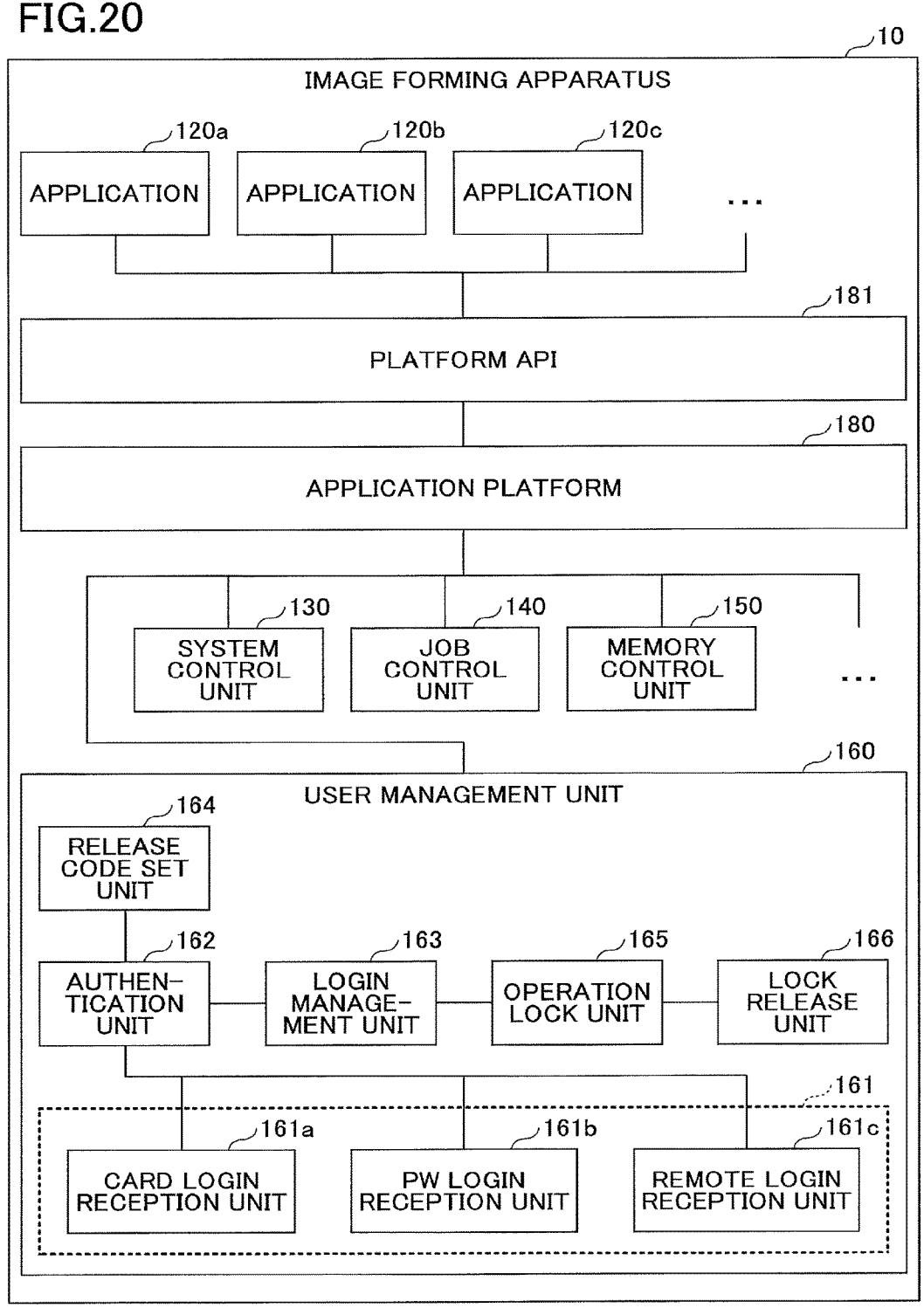
FIG. 20 is a schematic diagram illustrating a functional configuration of the image forming apparatus according to a tenth embodiment.

Next, a tenth embodiment is described. FIG. 20 is a schematic diagram illustrating a functional configuration of the image forming apparatus according to the tenth embodiment. In FIG. 20, the same reference numbers as those in FIG. 3 are referred to by the same reference numbers, and their description is appropriately omitted.

In FIG. 20, the image forming apparatus 10 includes an application platform 180 which manages all or part of the applications 120 functioning on the image forming apparatus 10. For example, the application platform 180 may manage a life cycle including a start, an end and or the like of each of the applications 120 and may provide a platform API 181 with the application 120. In the platform API 181, API with regard to the system control unit 130, the job control unit 140, the memory control unit 150, the user management unit 160, and the like is made to be common for a plurality of types of the image forming apparatus.

Basically, processing procedures executed by the image forming apparatus 10 of the tenth embodiment, which includes structures shown in FIG. 20, may be similar to processing procedures described in other embodiments. However, according to the tenth embodiment, communications between the application 120 and other functional unit such as the system control unit 130, the job control unit 140, the memory control unit 150 and the user management unit 160 are executed via the application platform 180.

In the above described embodiments, specifications of the release code (such as digits), the lock screen displaying time-out time, the upper value of the input times of the release code and the like may be, for example, set by a user via a setting screen displayed on the operation panel 15.

Figure 21C:
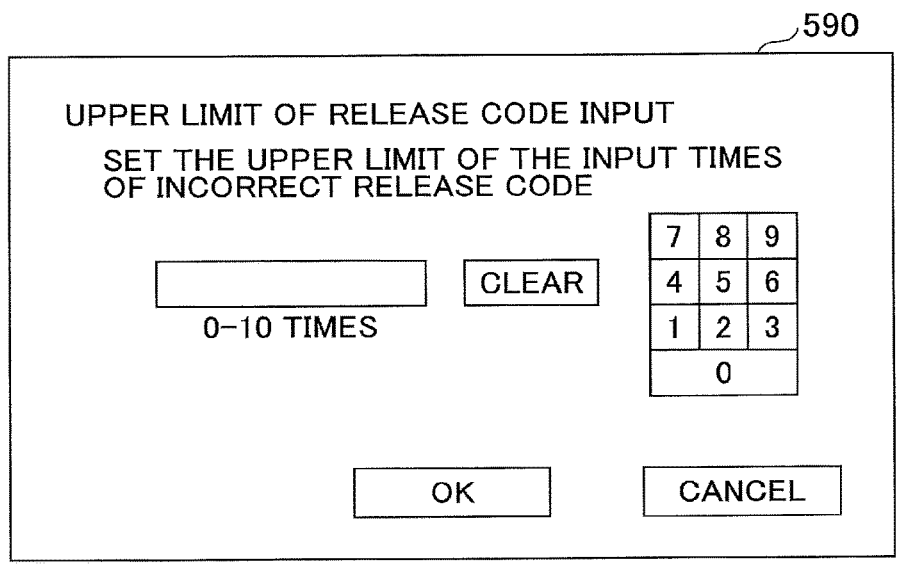

FIGS. 21A, 21B, and 21C are screen examples of a screen of various setting. In FIG. 21A, the release code specification setting screen 570 is a setting screen for setting a specification of the release code. Thus, the number of digits of the release code, characters usable for the release code, and the like may be set in the release code specification setting screen 570. When "a system notification" is selected as a choice, the release code may be generated by the image forming apparatus 10 as described in the fourth embodiment (FIG. 12). That is, specification of the release code in the image forming apparatus 10 may not fixed but may be set based on the setting of the user.

A lock screen displaying timer setting screen 580 shown in FIG. 21B is a setting screen for setting a time-out time of the lock screen displaying. Thus, according to the seventh embodiment, the operation lock unit 165 displays the lock screen 550 when a time measured by the lock screen displaying timer reaches the lock screen displaying time-out time which is set via the lock screen displaying timer setting screen 580. In an example shown in FIGS. 21A, 21B, and 21C, the settable maximum value is sixty minutes. In a case that "0" is input as the lock screen displaying time-out time, the lock screen 550 is displayed immediately in response to the end of the job or the like. A current setting value may be displayed in the input area of the lock screen displaying time-out time.

The upper limit number of times setting screen 590 shown in FIG. 21B is a screen for setting the upper limit value (upper limit number of times) of the times of the input of an incorrect release code. In an example shown in FIGS. 21A, 21B, and 21C, the settable upper limit value is ten times. A current setting value may be displayed in the input area of the upper limit number of times.

Only a user who has authority of the manager may be able to operate the setting screens illustrated in FIG. 21.

Although the image forming apparatus 10 is described as an example of the information processing apparatus, another information processing apparatus, to which a plurality of users may login, such as various devices and apparatuses, may be used instead of the image forming apparatus 10.

In the described embodiments, the release code set unit 164 is an example of a reception unit and a displaying unit, the operation lock unit 165 is an example of a restriction unit, the lock release unit 166 is an example of a releasing unit, and the release code is an example of input information.

It may be noted that a person skilled in a field of information processing technology may work the present invention using application specific integrated circuits (ASIC) or an apparatus in which circuit modules are connected.

Further, each of the functions (units) may be implemented by one or more circuits.

It may be noted that, in this specification, the circuit may include a processor programed by software to execute each of the functions and hardware which is designed to execute each of the functions such as the ASIC and the circuit module.

Further, the present invention is not limited to these embodiments, but various variations and modifications may be made without departing from the scope of the present invention.

The present application is based on Japanese priority application No. 2014-253397 filed on Dec. 15, 2014, with the Japanese Patent Office, the entire contents of which are hereby incorporated by reference.

What is claimed is:

1. An information processing apparatus, comprising:
circuitry configured to
receive a first login and authentication information of a first user;
when the first user is successfully authenticated, receive a first input information from the first user to set a release code that implements a use restriction to restrict use of the information processing apparatus at a later time, and log in the first user to the information processing apparatus;
receive a second login and authentication information of a second user, and when the second user is successfully authenticated, allow the second user to be logged in and operate the information processing apparatus while the first user remains logged into the information processing apparatus;
impose the use restriction to restrict use of the information processing apparatus at a predetermined timing after the second user logs into the information processing apparatus and while the first user remains logged into the information processing apparatus; and
release the use restriction in response to an input of a second input information that matches the first input information set by the first user as the release code, wherein
the input of the second input information is separate from the second user login, and
the circuitry restricts use of the information processing apparatus until the use restriction is released by the circuitry.

2. The information processing apparatus as claimed in claim 1, wherein the circuitry is configured to impose the use restriction by controlling a display to display a screen requiring the input of the release code.

3. The information processing apparatus as claimed in claim 1, wherein the predetermined timing is a timing at which the second user executes a logout operation to logout of the information processing apparatus.

4. The information processing apparatus as claimed in claim 1, wherein the predetermined timing is a timing at which a process requested by the second user is finished and the second user remains logged into the information processing apparatus.

5. The information processing apparatus as claimed in claim 1, wherein the circuitry is configured to impose the use restriction every time a process requested by the first user is finished.

6. The information processing apparatus as claimed in claim 1, wherein the circuitry is configured to impose the use restriction upon occurrence of an event that an operation of the information processing apparatus is not executed for a predetermined time period after a process requested by the first user is finished.

7. The information processing apparatus as claimed in claim 1, wherein a number of digits of the release code is shorter than a number of digits of an input information requested when the first user logs into the image processing apparatus.

8. An information processing method, implemented by circuitry of an information processing apparatus, comprising:
receiving a first login and authentication information of a first user;
when the first user is successfully authenticated, receive a first input information from the first user to set a release code that implements a use restriction to restrict use of the information processing apparatus at a later time, and log in the first user to the information processing apparatus;
receive a second login and authentication information of a second user, and when the second user is successfully authenticated, allow the second user to be logged in and operate the information processing apparatus while the first user remains logged into the information processing apparatus;
impose the use restriction to restrict use of the information processing apparatus at a predetermined timing after the second user logs into the information processing apparatus and while the first user remains logged into the information processing apparatus; and
release the use restriction in response to an input of a second input information that matches the first input information set by the first user set by the first user as the release code,
wherein
the input of the second input information is separate from the second user login, and
the circuitry restricts use of the information processing apparatus until the use restriction is released.

9. The information processing method as claimed in claim 8, wherein the imposing the use restriction includes controlling, by the circuitry, a display to display a screen requiring the input of the release code.

10. The information processing method as claimed in claim 8, wherein the predetermined timing is a timing at which the second user executes a logout operation to logout of the information processing apparatus.

11. The information processing method as claimed in claim 8, wherein the predetermined timing is a timing at which a process requested by the second user is finished and the second user remains logged into the information processing apparatus.

12. The information processing method as claimed in claim 8, wherein the imposing the use restriction is repeated each time a process requested by the first user is finished.

13. The information processing method as claimed in claim 8, wherein the imposing the use restriction is performed upon occurrence of an event that an operation of the information processing apparatus is not executed for a predetermined time period after a process requested by the first user is finished.

14. A non-transitory computer readable medium storing executable instructions that, when executed by circuitry of an information processing apparatus, cause the information processing apparatus to perform a process comprising:
receiving a first login and authentication information of a first user;
when the first user is successfully authenticated, receive a first input information from the first user to set a release code that implements a use restriction to restrict use of the information processing apparatus at a later time, and log in the first user to the information processing apparatus;
receive a second login and authentication information of a second user, and when the second user is successfully authenticated, allow the second user to be logged in and operate the information processing apparatus while the first user remains logged into the information processing apparatus;
impose the use restriction to restrict use of the information processing apparatus at a predetermined timing after the second user logs into the information processing apparatus and while the first user remains logged into the information processing apparatus; and
release the use restriction in response to an input of a second input information that matches the first input information set by the first user as the release code,
wherein
the input of the second input information is separate from the second user login, and
use of the information processing apparatus is restricted until the use restriction is released.

15. The non-transitory computer readable medium as claimed in claim 14, wherein the imposing the use restriction includes controlling a display to display a screen requiring the input of the release code.

16. The non-transitory computer readable medium as claimed in claim 14, wherein the predetermined timing is a timing at which the second user executes a logout operation to logout of the information processing apparatus.

17. The non-transitory computer readable medium as claimed in claim 14, wherein the predetermined timing is a timing at which a process requested by the second user is finished and the second user remains logged into the information processing apparatus.

18. The non-transitory computer readable medium as claimed in claim 14, wherein the imposing the use restriction is repeated each time a process requested by the first user is finished.

19. The non-transitory computer readable medium as claimed in claim 14, wherein the imposing the use restriction is performed upon occurrence of an event that an operation of the information processing apparatus is not executed for a predetermined time period after a process requested by the first user is finished.

20. The information processing method as claimed in claim 8, wherein a number of digits of the release code is shorter than a number of digits of an input information requested when the first user logs into the image processing apparatus.

* * * * *